United States Patent
Li et al.

(10) Patent No.: US 11,682,179 B2
(45) Date of Patent: Jun. 20, 2023

(54) MEASURING METHOD

(71) Applicant: Industrial Technology Research Institute, Hsinchu (TW)

(72) Inventors: Yu-Tai Li, Taichung (TW); Kao-Chi Lin, Kaohsiung (TW); Cho-Fan Hsieh, Yilan County (TW); Teng-Chun Wu, Kinmen County (TW); Cheng-Yu Peng, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/542,504

(22) Filed: Dec. 6, 2021

(65) Prior Publication Data

US 2023/0119864 A1 Apr. 20, 2023

(30) Foreign Application Priority Data

Oct. 20, 2021 (TW) .................................. 110138960

(51) Int. Cl.
*G06T 19/00* (2011.01)
*G06T 3/40* (2006.01)

(52) U.S. Cl.
CPC .......... *G06T 19/006* (2013.01); *G06T 3/4038* (2013.01)

(58) Field of Classification Search
CPC ............... G06T 19/006; G06T 3/4038; G05B 2219/37131
See application file for complete search history.

(56) References Cited

U.S. PATENT DOCUMENTS 8,388,204 B2   3/2013   Case et al.
9,841,688 B2   12/2017  Ko et al.
(Continued)

FOREIGN PATENT DOCUMENTS

CA      2356202    7/2000
CN    102362226    2/2012
(Continued)

OTHER PUBLICATIONS

Jin Xu, Wentong Ye, Xuxiang Ni, and Xiangqun Cao, "Virtual moiré fringe for grating measurement system based on CMOS microscopic imaging", Nov. 9, 2010, Proc. SPIE 7853, Advanced Sensor Systems and Applications IV, 785325, 6 pages. (Year: 2010).*
(Continued)

*Primary Examiner* — Jeffery A Brier
(74) *Attorney, Agent, or Firm* — JCIPRNET

(57) ABSTRACT

A measuring method includes the following. An image to be tested of an object to be tested with a first characteristic pattern is formed and is copied to form multiple images to be tested. The multiple images to be tested are superimposed to form a to-be-tested overlapped image which has the multiple first characteristic patterns. A reference image of a reference object with a second characteristic pattern is formed and is copied to form multiple reference images. The multiple reference images are superimposed to form a reference overlapped image which has the multiple second characteristic patterns. The to-be-tested overlapped image and the reference overlapped image are superimposed to generate a virtual moiré image having a moiré pattern different from the multiple first characteristic patterns and the multiple second characteristic patterns.

18 Claims, 21 Drawing Sheets

(56) References Cited

U.S. PATENT DOCUMENTS

| | | |
|---|---|---|
| 2006/0044568 A1 | 3/2006 | Weiss |
| 2015/0049331 A1 | 2/2015 | Ri |
| 2021/0158497 A1* | 5/2021 | Jia et al. ................. G06T 5/007 |
| 2021/0183031 A1* | 6/2021 | Lin ........................ G02B 27/60 |

FOREIGN PATENT DOCUMENTS

| | | | |
|---|---|---|---|
| CN | 102879418 A * | 1/2013 | |
| JP | H081371 B2 * | 1/1996 | |
| JP | 2000006502 A * | 1/2000 | |
| TW | I500919 | 9/2015 | |
| TW | I626601 | 6/2018 | |
| TW | I651543 | 2/2019 | |
| TW | I718352 | 2/2021 | |
| TW | 202137054 | 10/2021 | |
| WO | 0039523 | 7/2000 | |

OTHER PUBLICATIONS

"Office Action of Taiwan Counterpart Application", dated Jul. 12, 2022, p. 1-p. 4.

A. Asundi, "Moire interferometry for deformation measurement", Optics and Lasers in Engineering, vol. 11, 1989, pp. 281-292.

* cited by examiner

MEASURING METHOD

CROSS-REFERENCE TO RELATED APPLICATION

This application claims the priority benefit of Taiwan application serial no. 110138960, filed on Oct. 20, 2021. The entirety of the above-mentioned patent application is hereby incorporated by reference herein and made a part of this specification.

TECHNICAL FIELD

The disclosure relates to a measuring method, and in particular, to a moirémeasuring method.

BACKGROUND

Among various renewable resources, the application of solar power has always been researched and developed. To effectively convert sunlight to electricity, a mainstream of developing solar batteries with a large size is to increase an area of a solar panel and a number of busbars in the solar panel. Increasing the area of the solar panel can promote the efficiency of receiving sunlight, and increasing the number of the busbars in the solar panel can promote the efficiency of the solar panel transmitting the energy. However, when the area of the solar panel and the number of the busbars in the solar panel are increased, deformation of the solar panel is more likely to occur. Therefore, how to effectively and rapidly detect the deformation of the solar panel has become a field to work on.

Generally, an occurrence of the deformation of the solar panel can be classified into two types that are indoor deformation and outdoor deformation. With regard to the indoor deformation, when the solar panel is manufactured in a factory, the solar panel has to undergo many processing procedures which may cause the deformation of the solar panel. For example, a silver adhesive or an aluminum adhesive used in the solar panel undergoes a screen printing and a high-temperature sintering process, a battery may curve due to the high temperature. In addition, when a solar battery module undergoes a high-temperature welding process, a processing area of the battery module may curve due to the high temperature. When an aluminum is aligned and installed, a mechanical stress generated during the process may cause slight deformation of the solar panel.

On the other hand, in the case where the solar panel is installed outdoors to generate electricity, when a typhoon, a hurricane, or an earthquake hits, slight deformation of the solar panel may be caused. A small crack or damage may even be caused. The deformation may affect the smoothness of the solar panel, decreasing the power generation efficiency.

To effectively measure an extent of indoor and outdoor deformation of the solar panel, the moiré method is a common measuring method. Generally, when the moiré method is adopted to measure the solar panel, a projector is required on a surface to be tested of the solar panel to form optical stripes. Deformation of the optical stripes on the surface to be tested is measured with a camera to obtain whether deformation occurs on the surface to be tested. However, in the conventional measuring method, at least one projector and one camera are required, so it is not easy to conduct fast measuring on the solar panel installed outdoors.

SUMMARY

According to some embodiments of the disclosure, a measuring method is provided. The measuring method includes the following. An image to be tested of the object to be tested with a first characteristic pattern is formed. The image to be tested is copied to form multiple images to be tested, and the multiple images to be tested are superimposed to form a to-be-tested overlapped image. The to-be-tested overlapped image has the multiple first characteristic patterns. A reference image of a reference object with a second characteristic pattern is formed. The reference image is copied to form multiple reference images, and the multiple reference images are superimposed to form a reference overlapped image. The reference overlapped image has the multiple second characteristic patterns. The to-be-tested overlapped image and the reference overlapped image are superimposed to generate a virtual moiré image. The virtual moiré image has a moiré pattern. The moiré pattern is different from the multiple first characteristic patterns, and the moiré pattern is different from the multiple second characteristic patterns. The moiré pattern is configured to measure a geometric size of the object to be tested.

According to another embodiments of the disclosure, a measuring method is provided. The measuring method includes the following. An image to be tested of the object to be tested with a first characteristic pattern is formed. The image to be tested is copied to form multiple images to be tested, and the multiple images to be tested are superimposed to form a to-be-tested overlapped image. The to-be-tested overlapped image has the multiple first characteristic patterns. A reference image of a reference object with a second characteristic pattern is formed. The reference image is copied to form multiple reference images, and the multiple reference images are superimposed to form a reference overlapped image. The reference overlapped image has the multiple second characteristic patterns. The to-be-tested overlapped image and the reference overlapped image are superimposed to generate a virtual moiré image. The virtual moiré image has a moiré pattern. The moiré pattern is different from the multiple first characteristic patterns, and the moiré pattern is different from the multiple second characteristic patterns. A relative movement between the to-be-tested overlapped image and the reference overlapped image is generated. The moiré pattern of the virtual moiré image is driven to change. A change of the moiré pattern corresponds to deformation of the object to be tested along a direction perpendicular to a surface of the object to be tested.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
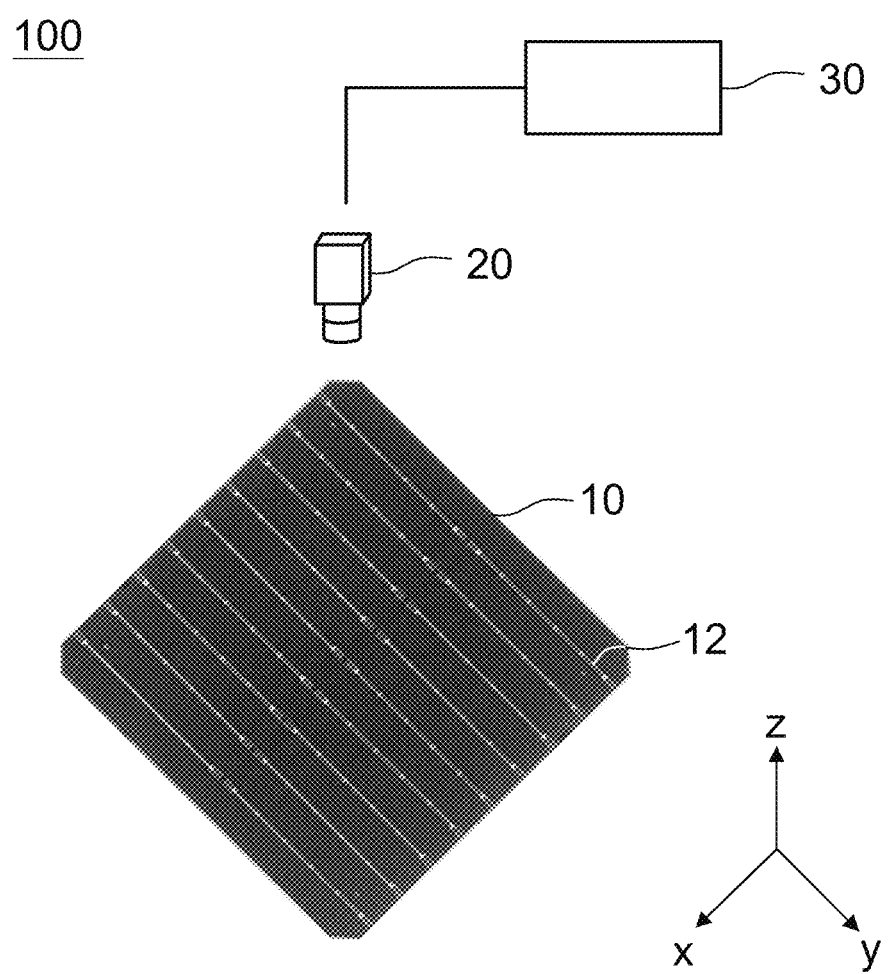
FIG. 1 is a schematic diagram of a measuring system according to some embodiments of the disclosure.

A description accompanied with embodiments and drawings is provided in the following to sufficiently explain the present disclosure. However, it is noted that the present disclosure may still be implemented in many other different forms and should not be construed as limited to the embodiments described hereinafter. In the drawings, the various components and their respective sizes are not drawn to scale for clarity.

The disclosure is directed to a measuring method capable of rapidly detecting deformation on a surface of an object.

The disclosure provides a testing method, and in particular, a nondestructive testing technology. In the testing method, a camera is adopted to test deformation of a solar battery, which effectively reduces a cost of a testing system and promotes the portability of the testing system. Furthermore, simple deformation information is rapidly provided for manufacturing analysis and product quality management in the production of a solar panel and for damage analysis when the solar panel is used outdoors.

The moiré method is a nondestructive testing method for measuring deformation of a sample surface. The basic concept thereof is as follows. First, a reference image with a regular optical pattern is projected on a surface to be tested of an object to be tested. By observing deformation (a regular change or an irregular change) of the reference image or by moving (translating or rotating) the reference image and observing a moving speed (at a constant speed or a non-constant speed) of the deformation of the reference image, an extent of the deformation of the surface to be tested is obtained.

In the disclosure, an image capturing device is adopted to capture an image of a surface to be tested of an object to be tested, and the image of the surface to be tested of the object to be tested is virtually superimposed on a known reference image through image processing. A change of the image is observed through the moiré method. As a result, it is not necessary to project the reference image on the surface to be tested of the object to be tested, so a volume of a measuring device may be greatly reduced so that a measuring system may be applied in many occasions.

FIG. 1 is a schematic diagram of a measuring system according to some embodiments of the disclosure. A measuring system 100 includes an object 10 to be tested, an image capturing device 20 located above the object 10 to be tested. The image capturing device 20 is configured to capture a surface image of a surface to be tested of the object 10 to be tested as an image to be tested. The measuring system 100 further includes a computer 30 configured to store and process the image to be tested of the object 10 to be tested captured by the image capturing device 20.

According to some embodiments, the object 10 to be tested may be a solar panel or other object whose surface to be tested has a regular characteristic pattern. The disclosure is not limited thereto. According to some embodiments, the image capturing device 20 may be a camera, a video camera, or other device capable of capturing the image to be tested of the object 10 to be tested. The disclosure is not limited thereto. According to some embodiments, the image to be tested of the object 10 to be tested captured by the image capturing device 20 is a digital image. According to some embodiments, a distance between the image capturing device 20 and the surface to be tested of the object 10 to be tested may be adjusted according an actual need of photographing. According to some embodiments, the distance between the image capturing device 20 and the surface to be tested of the object 10 to be tested may allow the image capturing device 20 to photograph the entire surface to be tested of the object 10 to be tested. According to some embodiments, the distance between the image capturing device 20 and the surface to be tested of the object 10 to be tested may allow the image capturing device 20 to photograph a part of the surface to be tested of the object 10 to be tested. According to some embodiments, the computer 30 may be a computer, a cellphone, a tablet computer, or any other device capable of storing and processing the image to be tested of the object 10 to be tested captured by the image capturing device 20. The disclosure is not limited thereto.

As shown in FIG. 1, the image to be tested is a surface image of the surface to be tested of the object to be tested photographed by the image capturing device 20 along a direction perpendicular to the surface to be tested of the object 10 to be tested. According to some embodiments, when the object 10 to be tested is a solar panel, busbars 12 regularly arranged on the solar panel may form a characteristic pattern that is arranged regularly. When the image capturing device 20 photographs the surface to be tested of the object 10 to be tested, the characteristic pattern that is arranged regularly and formed by the busbars 12 that are regularly arranged on the solar panel may be captured. Since busbars on the solar panel form on the solar panel, it may be obtained whether deformation occurs on the solar panel by measuring deformation generated by the characteristic pattern formed by the busbars. The image to be tested of the surface of the object 10 to be tested captured by the image capturing device 20 may be transmitted to the computer 30 to store and analyze the image to be tested of the object 10 to be tested captured by the image capturing device 20.

Figure 2A:
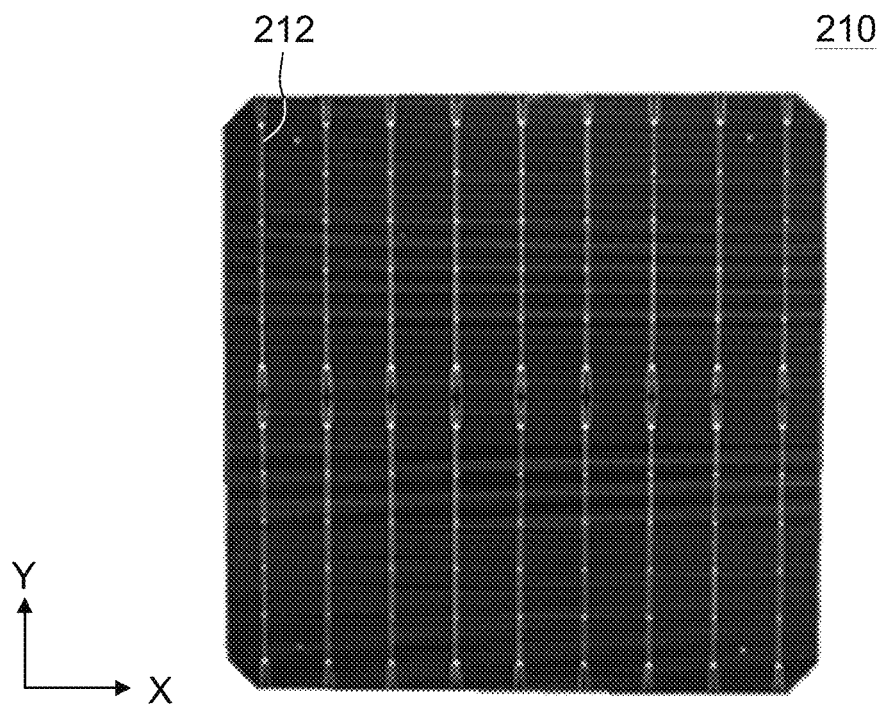
FIG. 2A is an image to be tested of an object to be tested according to some embodiments of the disclosure.

FIG. 2A to FIG. 2E are schematic diagrams illustrating sequentially converting an image to be tested of the object to be tested into a to-be-tested overlapped image according to some embodiments of the disclosure. FIG. 2A is an image 210 to be tested of an object to be tested according to some embodiments of the disclosure. According to some embodiments, the image to be tested 210 in FIG. 2A is the surface image of the surface to be tested of the object 10 to be tested captured by the image capturing device 20. In FIG. 2A, the dark part is shown as a substrate shape of the solar panel of the object 10 to be tested, and in FIG. 2A, white lines correspond to the busbars arranged regularly on the solar panel of the object 10 to be tested. Generally, in a solar panel, busbars are parallel to each other with the same interval. Accordingly, the white lines generated by the busbars may serve as a characteristic pattern 212 of the image 210 to be tested. According to some embodiments, an image to be tested formed by a different object to be tested may have a different characteristic pattern, such as a stripe, a circle, an ellipse, or an equivalent shape. The disclosure is not limited thereto.

Figure 2B:
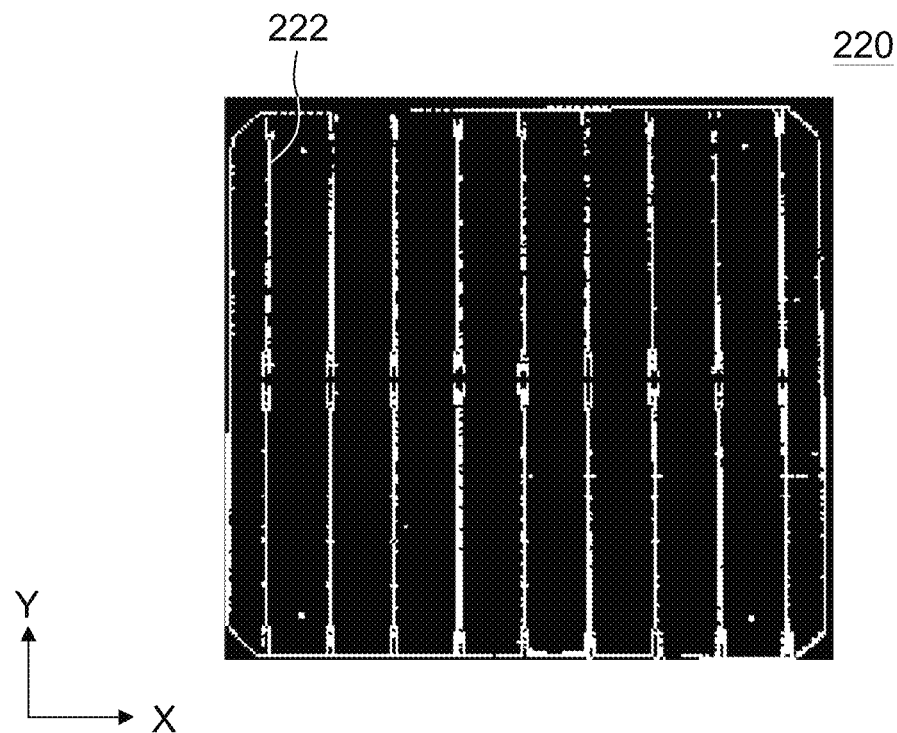
FIG. 2B is a binary image to be tested of an image to be tested according to some embodiments of the disclosure.

FIG. 2B is a binary image 220 to be tested of the image 210 to be tested according to some embodiments of the disclosure. According to some embodiments, in the image 210 to be tested of the object 10 to be tested captured by the image capturing device 20 shown in FIG. 2A, a resolution or contrast of a surface image may not be high enough due to poor photographing environment, such as insufficient light or a tainted surface. Therefore, a binarization process is conducted on the image 210 to be tested of the object 10 to be tested captured by the image capturing device 20 shown in FIG. 2A by the computer 30 so that each pixel value in the image 210 to be tested of FIG. 2A is converted into one of 0 or 1. As a result, an extent of contrast is enhanced, and a characteristic pattern 222 corresponding to the characteristic pattern 212 of the image 210 to be tested in a binary image 220 to be tested is more distinct. According to some embodiments, the binarization process may not be conducted on the image 210 to be tested.

Figure 2C:
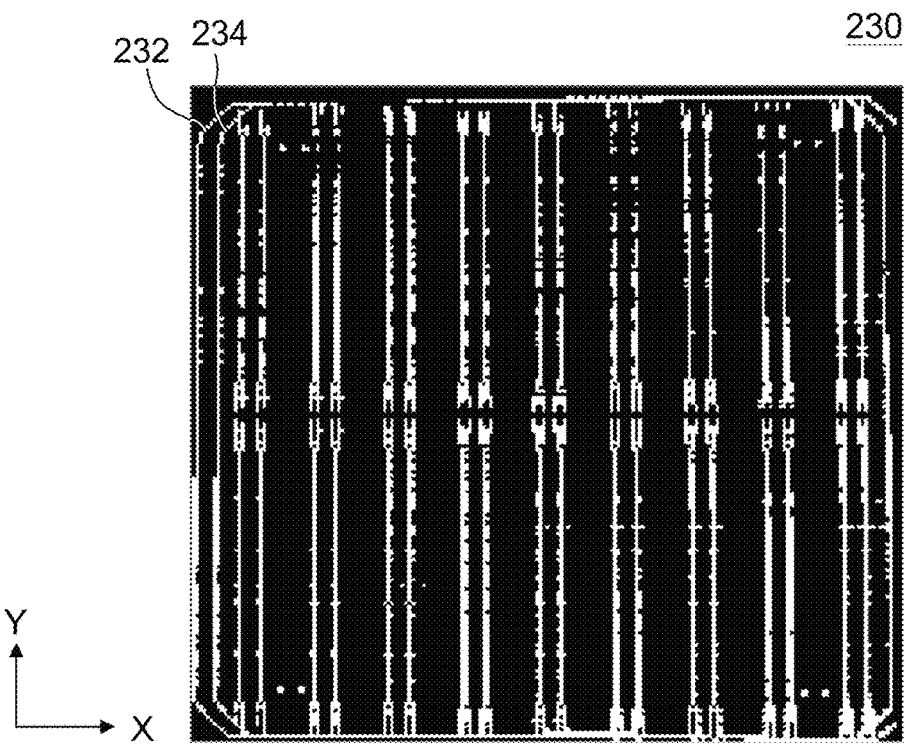
FIG. 2C, FIG. 2D, and FIG. 2E are to-be-tested overlapped images of images to be tested according to some embodiments of the disclosure.
Figure 2D:
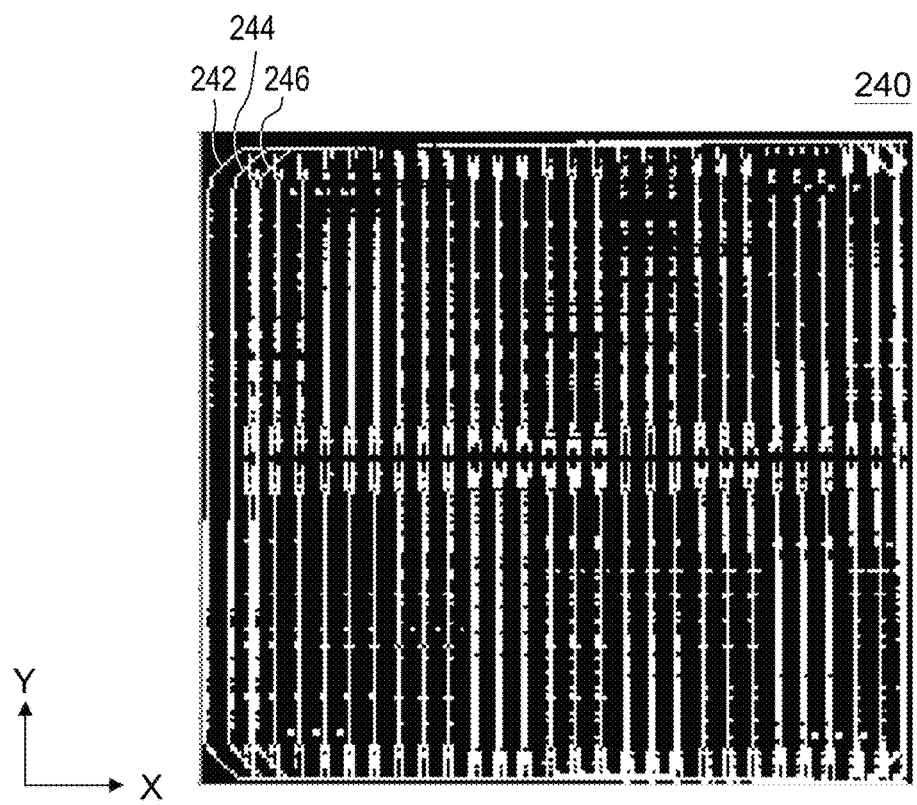
Figure 2E:
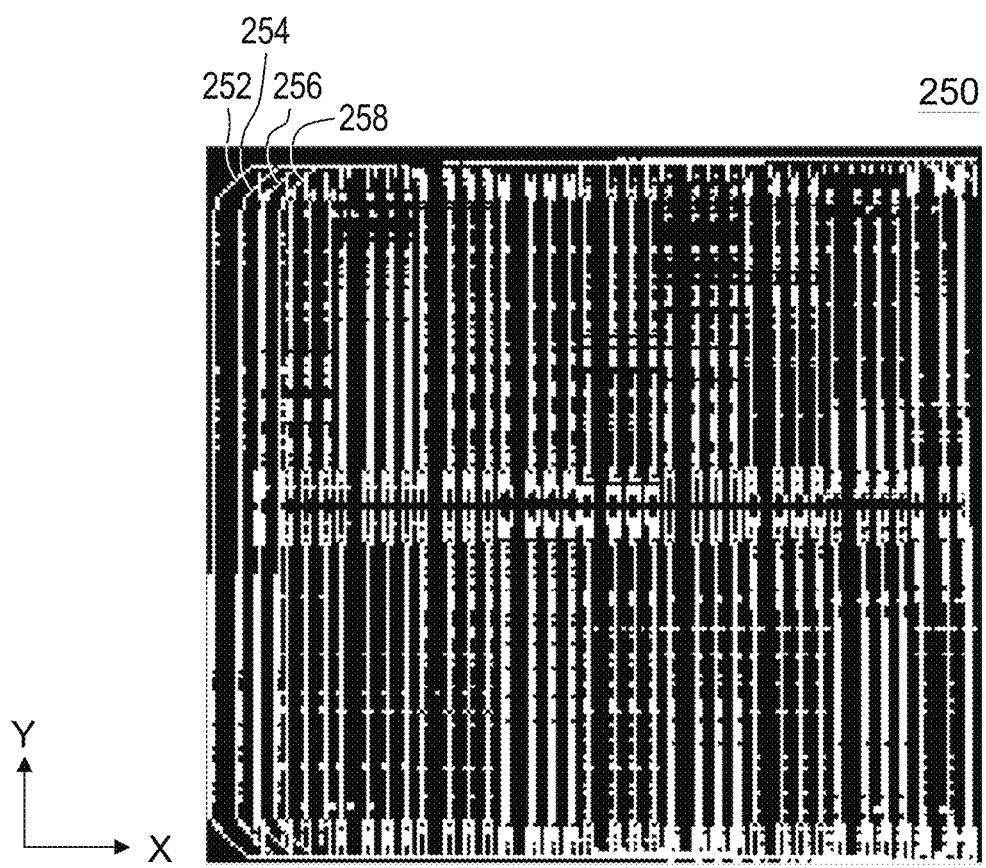

FIG. 2C, FIG. 2D, and FIG. 2E are to-be-tested overlapped images according to some embodiments of the disclosure. In the binary image 220 to be tested of the image 210 to be tested shown in FIG. 2B, a distribution numbers of the characteristic patterns 222 in the image 220 to be tested, such as the busbars on the solar panel, may be insufficient due to distribution, and a resolution when conducting the moiré method is thus too low. Therefore, it is necessary to superimpose images to form a to-be-tested overlapped image to increase the number of the characteristic patterns 222 so that the resolution when conducting the moiré method is increased. According to some embodiments, superimposing the images is forming the to-be-tested overlapped image with regard to the image 220 to be tested through image processing by the computer 30.

Taking FIG. 2C as an example, in FIG. 2C, first, the binary image 220 to be tested of FIG. 2B with the characteristic pattern 222 serves as a first image with a characteristic pattern 232.

Next, the first image is copied, and the copied first image is translated a distance along a direction to serve as a second image with a characteristic pattern 234. Then, the first image and the second image are superimposed to obtain a to-be-tested overlapped image 230 with the characteristic pattern 232 and the characteristic pattern 234. According to some embodiments, when a test sample is the solar panel, a translation direction of the first image may be parallel to a direction of the busbars, be perpendicular to the busbars, or any other directions. The disclosure is not limited thereto. According to some embodiments, in FIG. 2C, the image 220 to be tested with the characteristic pattern 222 of FIG. 2B serves as the first image with the characteristic pattern 232, and the first image is moved a distance of 10 pixels along the direction perpendicular to the busbars to serve as the second image with a characteristic pattern 234. Next, the first image and the second image are superimposed to form the to-be-tested overlapped image 230 of FIG. 2C. The to-be-tested overlapped image 230 has the characteristic pattern 232 and the characteristic pattern 234. Since a process of superimposing the images is superimposing the images through image processing by the computer 30, the to-be-tested overlapped image 230 may also be called a virtual to-be-tested overlapped image. Since FIG. 2C is obtained by superimposing two images, the first image and the second image, FIG. 2C may also be called a double stripe overlapped image.

According to some embodiments, in FIG. 2D, the binary image 220 to be tested of FIG. 2B with the characteristic pattern 222 serves as a first image with the characteristic pattern 242, and the first image is copied. The copied first image is moved a distance of 7 pixels along the direction perpendicular to the busbars to serve as a second image with a characteristic pattern 244. Next, the first image is copied, and the copied first image is moved a distance of 14 pixels along the direction perpendicular to the busbars to serve as a third image with a characteristic pattern 246. Next, the first image, the second image, and the third image are superimposed to form the to-be-tested overlapped image 240 of FIG. 2D with the characteristic pattern 242, the characteristic pattern 244, and the characteristic pattern 246. Since a process of superimposing the images is superimposing the images through image processing by the computer 30, the to-be-tested overlapped image 240 may also be called a virtual to-be-tested overlapped image. Since FIG. 2D is obtained by superimposing three images (the first image, the second image, and the third image), FIG. 2D may also be called triple stripe overlapped image.

According to some embodiments, a displacement distance between different images, such as a displacement distance between the first image and the second image and a displacement distance between the second image and the third image, may be equal or not equal. The disclosure is not limited thereto.

According to some embodiments, in FIG. 2E, the binary image 220 to be tested of FIG. 2B with the characteristic pattern 222 serves as a first image with the characteristic pattern 252, and the first image is copied. The copied first image is moved a distance of 7 pixels along the direction perpendicular to the busbars to serve as a second image with a characteristic pattern 254. Next, the first image is copied, and the copied first image is moved a distance of 14 pixels along the direction perpendicular to the busbars to serve as a third image with a characteristic pattern 256. Next, the first image is copied, and the copied first image is moved a distance of 17 pixels along the direction perpendicular to the busbars to serve as a fourth image with a characteristic pattern 258. Next, the first image, the second image, the third image, and the fourth image are superimposed to form the to-be-tested overlapped image 250 of FIG. 2E with the characteristic pattern 252, the characteristic pattern 254, the characteristic pattern 256, and the characteristic pattern 258. Since a process of superimposing the images is superimposing the images through image processing by the computer 30, the to-be-tested overlapped image 250 may also be called a virtual to-be-tested overlapped image. Since FIG. 2E is obtained by superimposing four images (the first image, the second image, the third image, and the fourth image), FIG. 2E may also be called quadruple stripe overlapped image.

In moiré analysis, a resolution of moiré analysis is related to an interval of a surface image characteristic of the to-be-tested overlapped image, such as an interval between the characteristic pattern 232 and the characteristic pattern 234, an interval among the characteristic pattern 242, the characteristic pattern 244, and the characteristic pattern 246, and an interval among the characteristic pattern 252, the characteristic pattern 254, the characteristic pattern 256, and the characteristic pattern 258. Therefore, the to-be-tested overlapped image 230, the to-be-tested overlapped image 240, and the to-be-tested overlapped image 250 after being processed through superimposing have a higher spatial resolution compared with the image 220 to be tested without being processed.

Figure 3A:
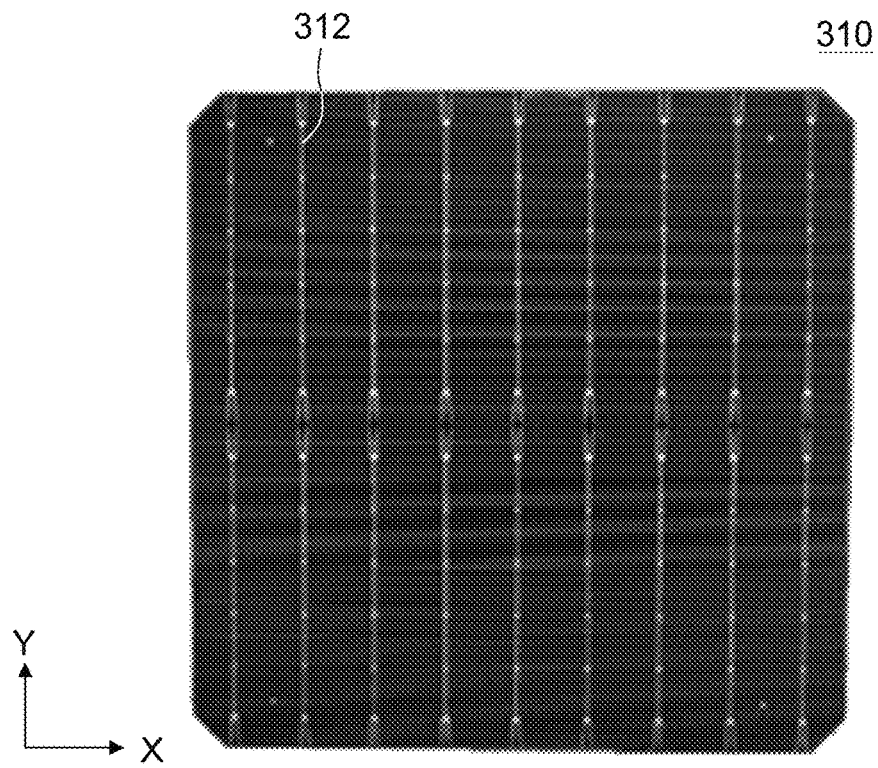
FIG. 3A is a reference image of a reference object according to some embodiments of the disclosure.
Figure 3B:
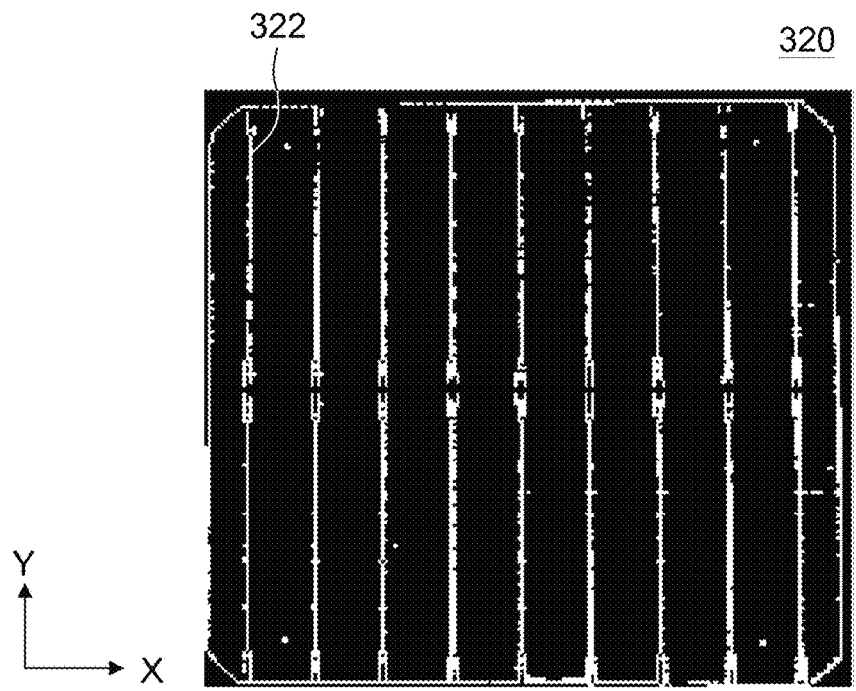
FIG. 3B is a binary image to be tested of a reference image according to some embodiments of the disclosure.
Figure 3C:
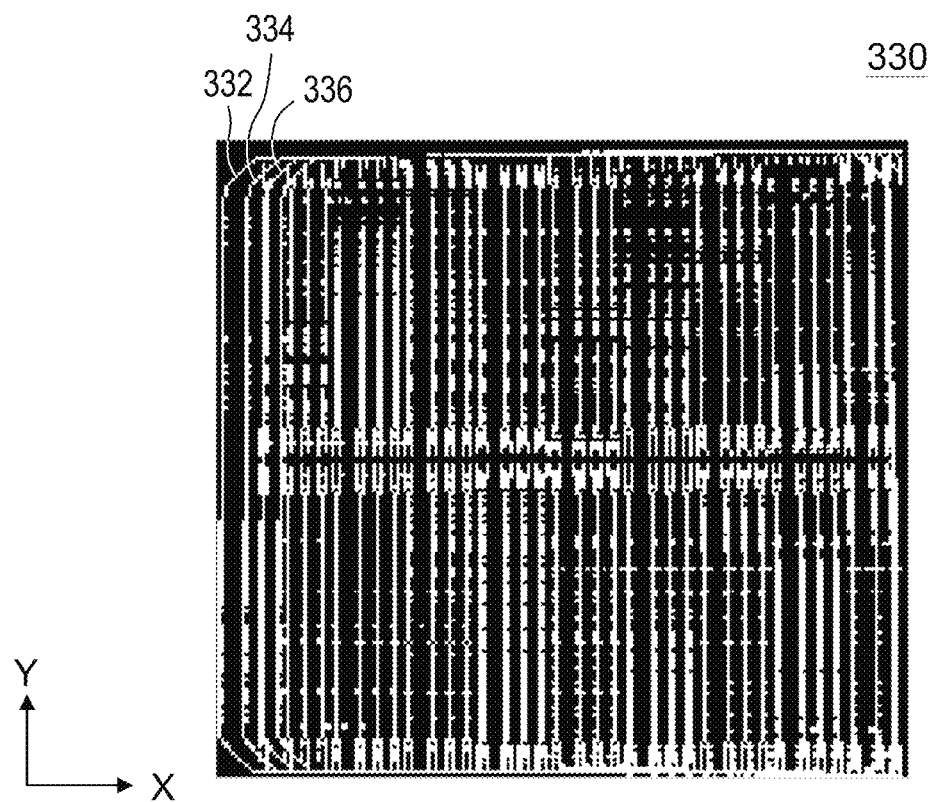
FIG. 3C is a reference overlapped image of a reference image according to some embodiments of the disclosure.

FIG. 3A to FIG. 3C are schematic diagrams illustrating converting a reference image of a reference object into a reference overlapped image according to some embodiments of the disclosure. FIG. 3A is a reference image 310 of a reference object according to some embodiments of the disclosure. According to some embodiments, the reference image 310 of FIG. 3A may be a surface image of a surface to be tested of the reference object. The reference image of the reference object may be photographed in the same manner of photographing the image to be tested of the object to be tested shown in FIG. 1, and relevant details are not repeated. According to some embodiments, the reference object may be obtained from a standard sample after testing to ensure a quality of the sample. According to some embodiments, the reference object may also be obtained from a computer aided design (CAD) file of the object 10 to be tested to ensure correctness of a pattern. The disclosure is not limited thereto. In FIG. 3A, white lines correspond to the busbars arranged regularly on the solar panel of the reference object. Therefore, the white lines generated by the busbars may serve as a characteristic pattern 312 of the reference image 310. According to some embodiments, a reference image formed by a different object to be tested may have a different characteristic pattern, such as a stripe, a circle, an ellipse, or an equivalent shape. The disclosure is not limited thereto.

FIG. 3B is a binary reference image 320 of the reference image 310 according to some embodiments of the disclosure. According to the similar method of producing the binary image 220 to be tested of the image 210 to be tested in FIG. 2B, the binary reference image 320 with a characteristic pattern 322 is produced with the reference image 310 with the characteristic pattern 312. Hence, relevant details of the process are not repeated.

FIG. 3C is a reference overlapped image of a reference image according to some embodiments of the disclosure. According to the similar method of producing the to-be-tested overlapped image of the image to be tested in FIG. 2C to FIG. 2E, a reference overlapped image 330 of the reference image 320 with a characteristic pattern 332, a characteristic pattern 334, and a characteristic pattern 336 is produced. Hence, relevant details of the process is not repeated. Since the reference overlapped image is formed through image processing, the reference overlapped image 330 may also be called a digital reference overlapped image or a virtual to-be-tested overlapped image.

According to some embodiments, a number of overlapped images of the to-be-tested overlapped image of the image to be tested may be the same as or different from a number of overlapped images of the reference overlapped image of the reference image. The disclosure is not limited thereto. For example, a producing process of the to-be-tested overlapped image may be double moiré superimposing, and a producing process of the reference overlapped image may be double moiré superimposing or triple moiré superimposing.

According to some embodiments, a producing process of the to-be-tested overlapped image may be the same as or different from a producing process of the reference overlapped image. The disclosure is not limited thereto. For example, both of the producing process of the to-be-tested overlapped image and the producing process of the reference overlapped image may be double moiré superimposing, and the second image of the image to be tested may be the first image of the image to be tested moving a distance of 10 pixels along the direction perpendicular to the busbars. A second image of the reference object may be a first image of the reference object moving a distance of 10 pixels along the direction perpendicular to the busbars or moving a distance of greater than 10 pixels or moving a distance of less than 10 pixels along the direction perpendicular to the busbars. The disclosure is not limited thereto.

Figure 4A:
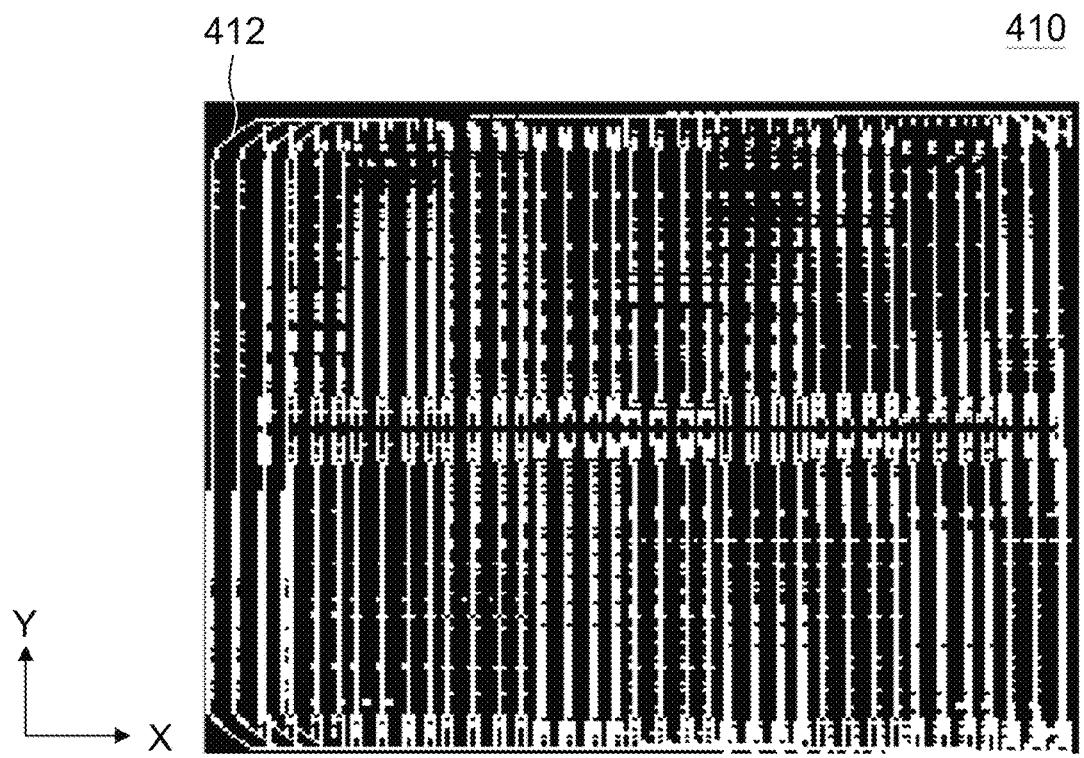
FIG. 4A is a to-be-tested overlapped image of images to be tested according to some embodiments of the disclosure.
Figure 4B:
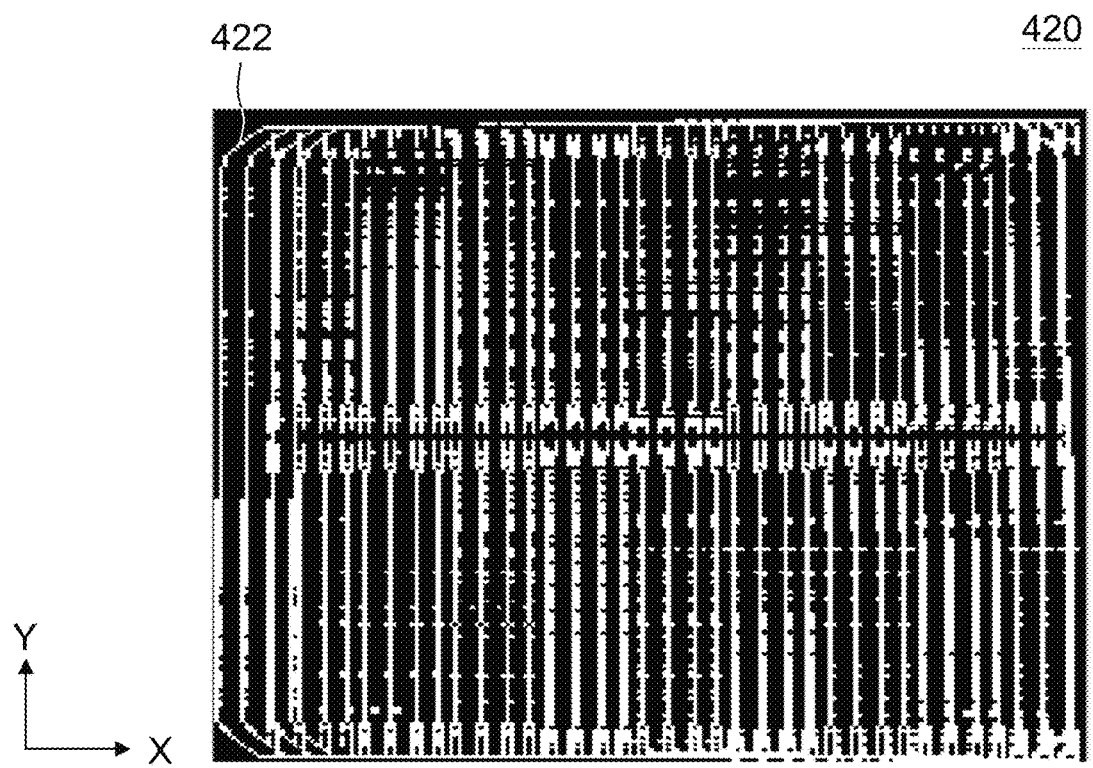
FIG. 4B is a reference overlapped image of a reference image according to some embodiments of the disclosure.

FIG. 4A to FIG. 4F illustrate forming a virtual moiré image with the to-be-tested overlapped image formed by the image to be tested and the reference overlapped image formed by the reference image. FIG. 4A is a to-be-tested overlapped image 410 of images to be tested according to some embodiments of the disclosure. The to-be-tested overlapped image has multiple characteristic patterns 412. For the detailed description, the description of FIG. 2A and FIG. 2E may be referred to, and it is not repeated. FIG. 4B is a reference overlapped image 420 of the reference object according to some embodiments of the disclosure. The to-be-tested overlapped image has multiple characteristic patterns 422. For the detailed description, the description of FIG. 3A and FIG. 3C may be referred to, and it is not repeated.

Figure 4C:
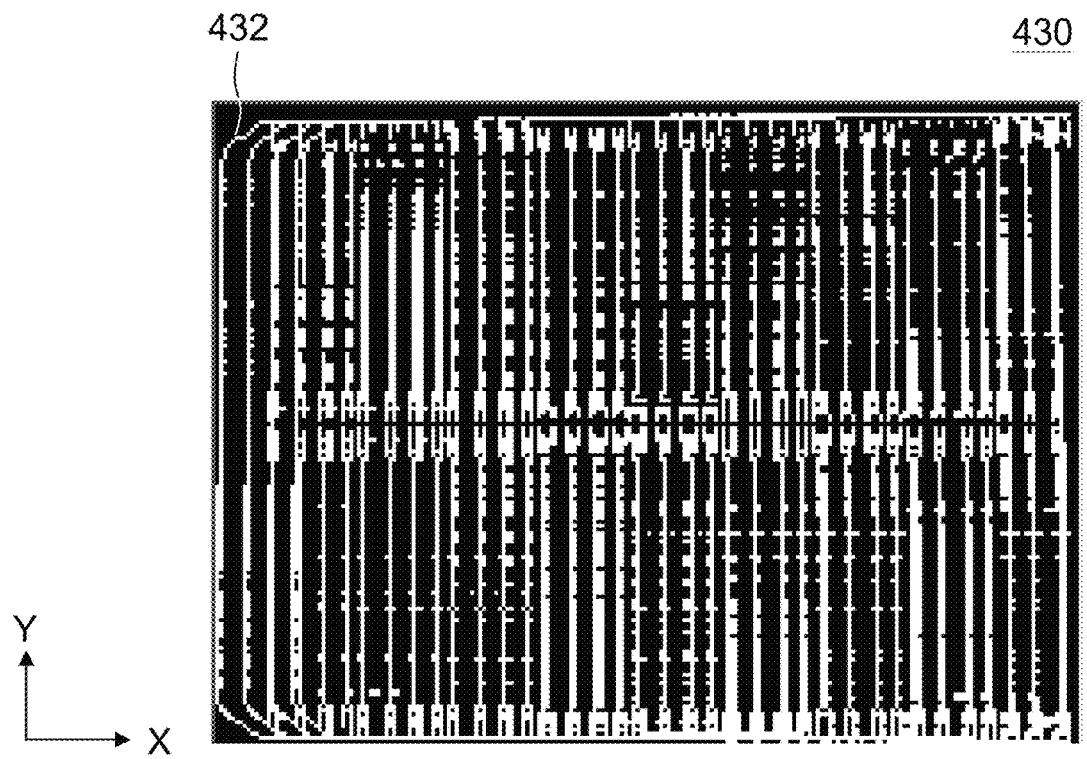
FIG. 4C, FIG. 4D, FIG. 4E, FIG. 4F, and FIG. 4G are virtual moiré images according to some embodiments of the disclosure.
Figure 4D:
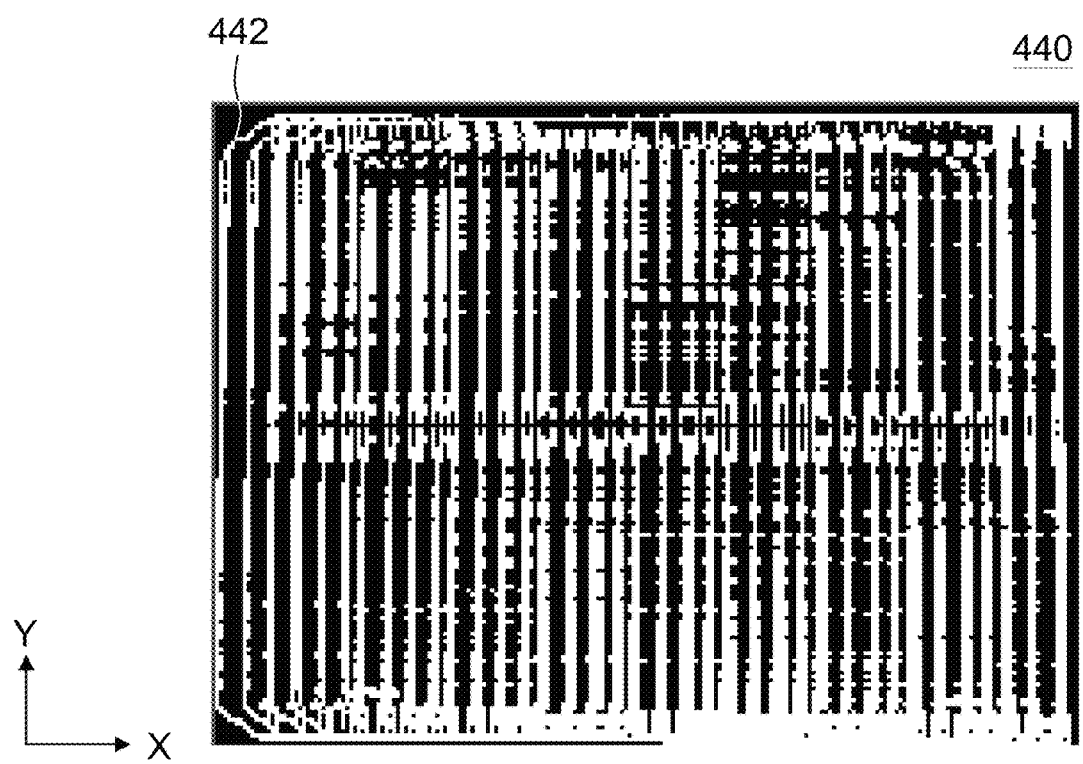
Figure 4E:
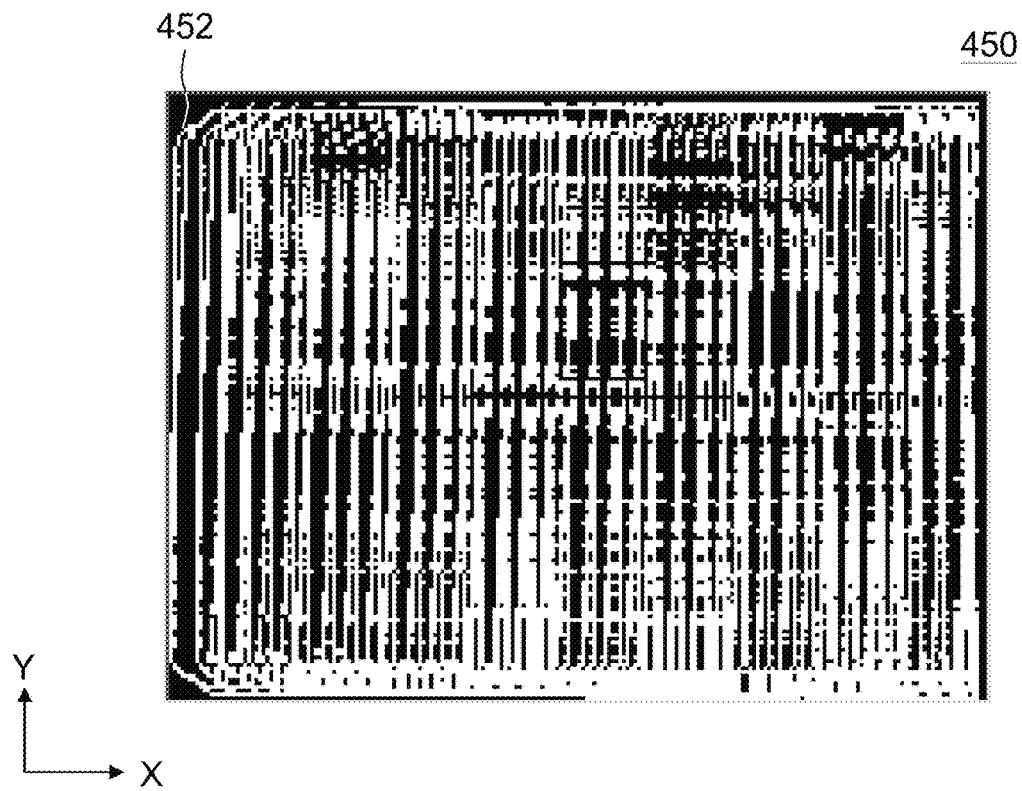
Figure 4F:
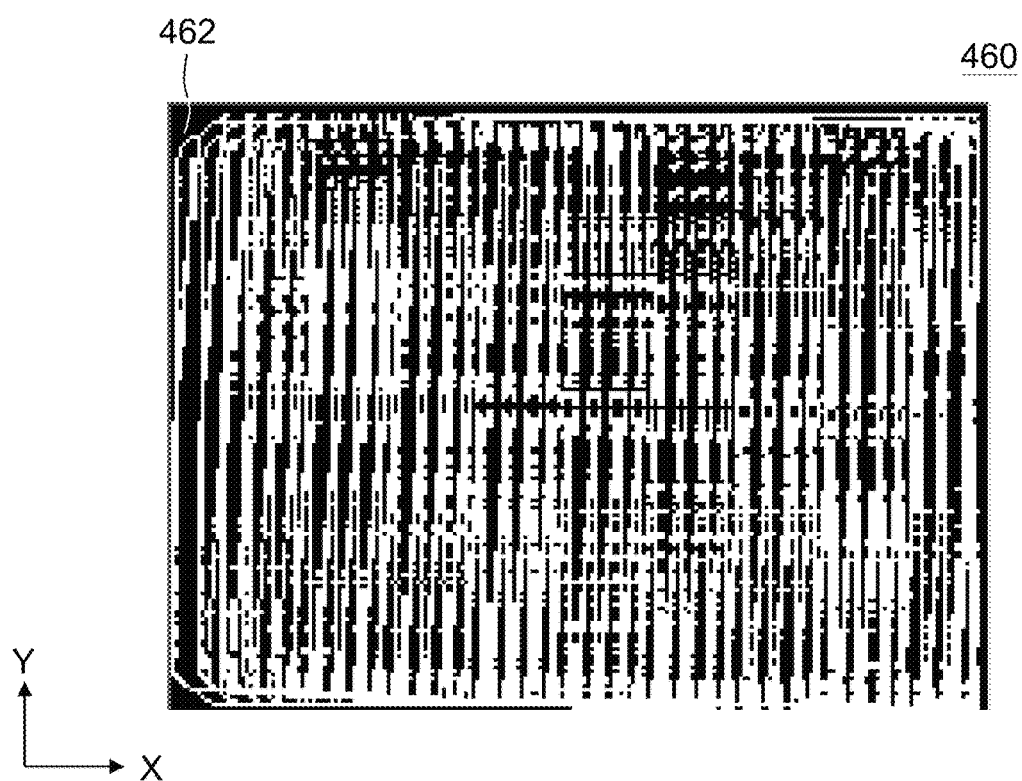
Figure 4G:
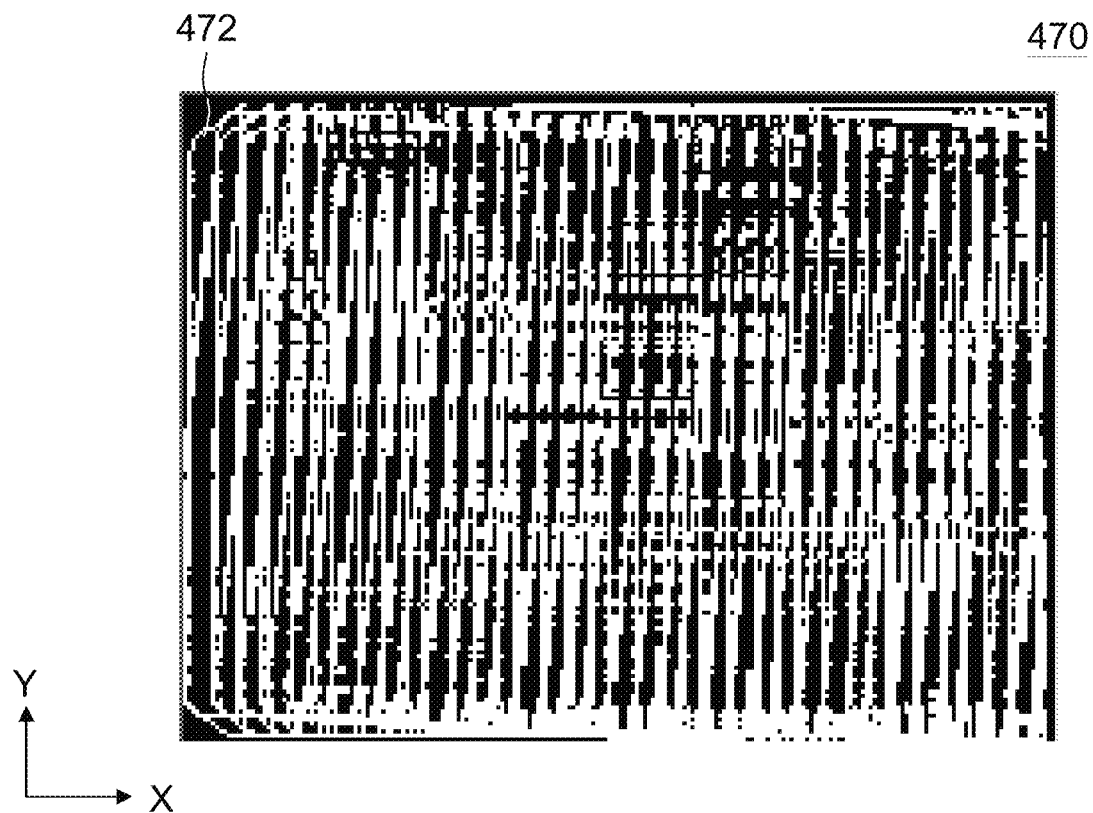

FIG. 4C, FIG. 4D, FIG. 4E, FIG. 4F, and FIG. 4G are virtual moiré images according to some embodiments of the disclosure. According to some embodiments, FIG. 4C is a virtual moiré image 430 generated by superimposing the to-be-tested overlapped image 410 of FIG. 4A and the reference overlapped image 420 of FIG. 4B through image processing by the computer 30 and moving the reference overlapped image 420 for a rotation angle 0° relative to the to-be-tested overlapped image 410. The virtual moiré image 430 has a moiré pattern 432. The moiré pattern 432 is different from the multiple characteristic patterns 412 of the to-be-tested overlapped image 410. The moiré pattern 432 is different from the multiple characteristic patterns 422 of the reference overlapped image 420. Since virtual moiré image 430 is formed through image processing, the virtual moiré image 430 may also be called a digital moiré image or a virtual moiré image.

FIG. 4D, FIG. 4E, FIG. 4F, and FIG. 4G are similar to FIG. 4C. The difference is that a virtual moiré image 440, a virtual moiré image 450, a virtual moiré image 460, and a virtual moiré image 470 are respectively obtained by respectively moving the reference overlapped image 420 for a rotation angle 1°, 2°, 3°, and 4° relative to the to-be-tested overlapped image 410. The virtual moiré image 440, the virtual moiré image 450, the virtual moiré image 460, and the virtual moiré image 470 respectively have a moiré pattern 442, a moiré pattern 452, a moiré pattern 462, and a moiré pattern 472. Through the virtual moiré image 430, the virtual moiré image 440, the virtual moiré image 450, the virtual moiré image 460, and the virtual moiré image 470 formed by the image to be tested and the reference object, it may be determined whether deformation occurs in the to-be-tested overlapped image 410 to further obtain whether deformation occurs on the object to be tested.

Since the reference overlapped image 420 is a pattern with a known geometric size, geometric sizes of the moiré pattern 432, the moiré pattern 442, the moiré pattern 452, the moiré pattern 462, and the moiré pattern 472 of the virtual moiré image 430, the virtual moiré image 440, the virtual moiré image 450, the virtual moiré image 460, and the virtual moiré image 470 may be obtained. Through a mathematical method such as geometric projection and coordinate conversion, a geometric size of the to-be-tested overlapped image may be obtained.

Figure 5A:
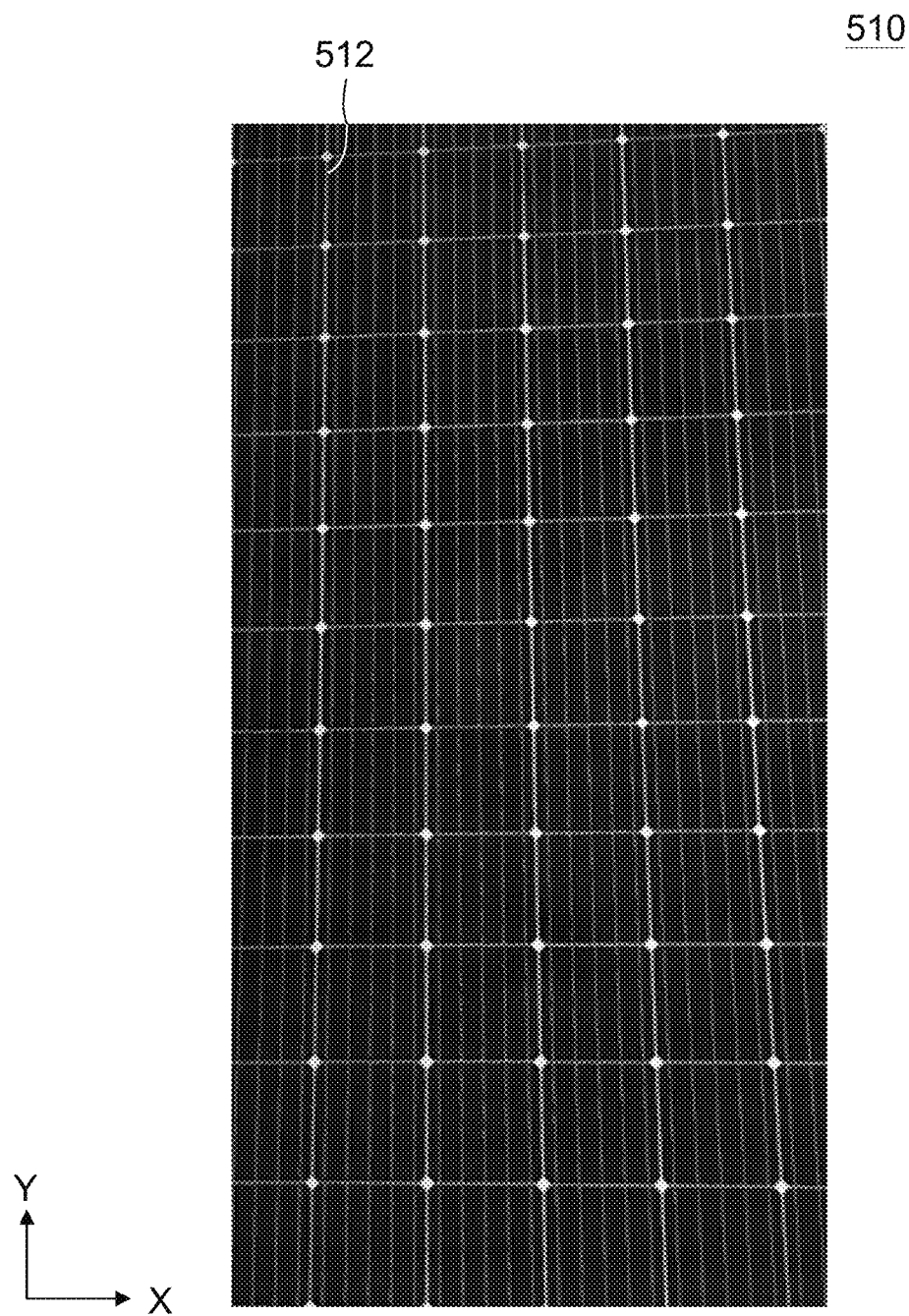
FIG. 5A is an image to be tested according to some embodiments of the disclosure.
Figure 5B:
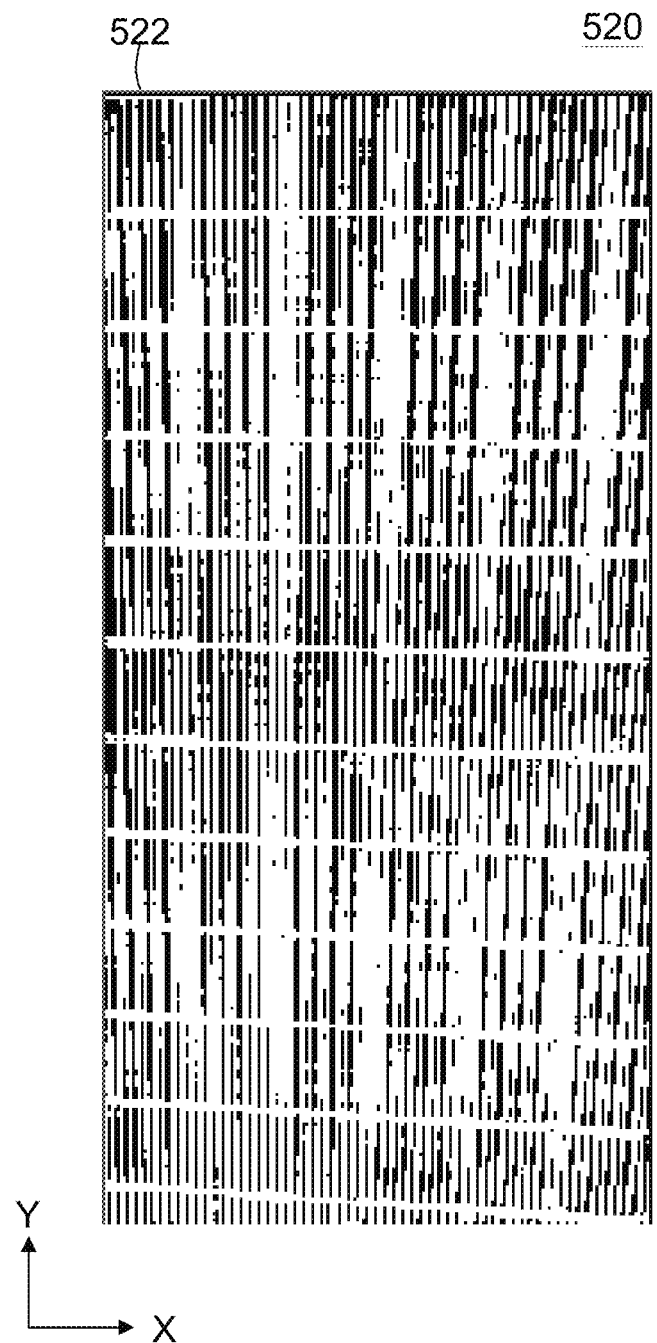
FIG. 5B is to-be-tested overlapped image of images to be tested according to some embodiments of the disclosure.
Figure 5C:
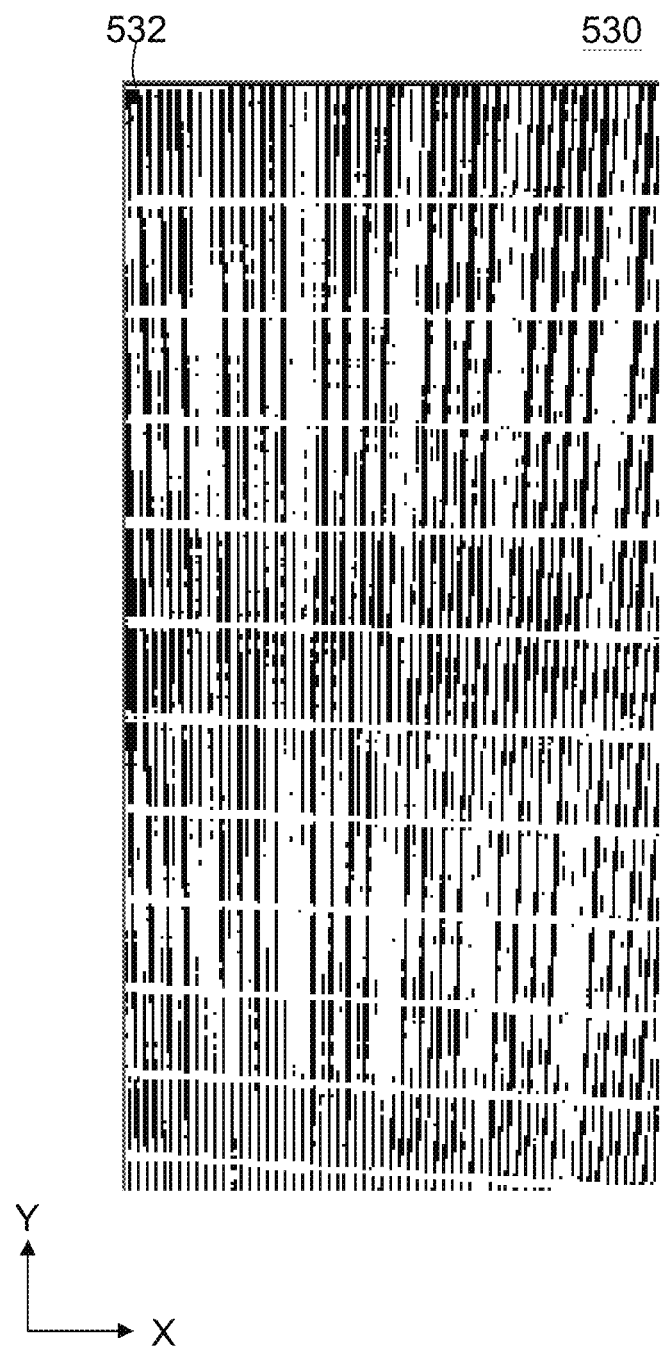
FIG. 5C is a reference overlapped image of a reference image according to some embodiments of the disclosure.
Figure 5D:
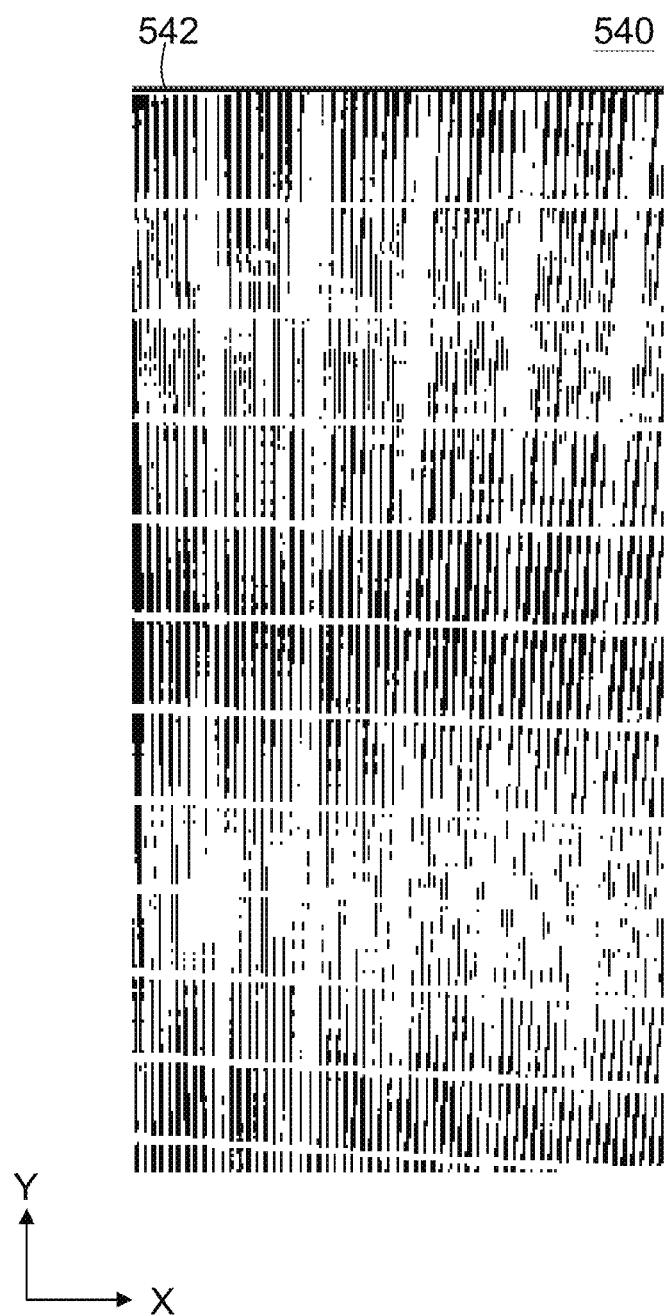
FIG. 5D, FIG. 5E, FIG. 5F, and FIG. 5G are virtual moiré images according to some embodiments of the disclosure.
Figure 5E:
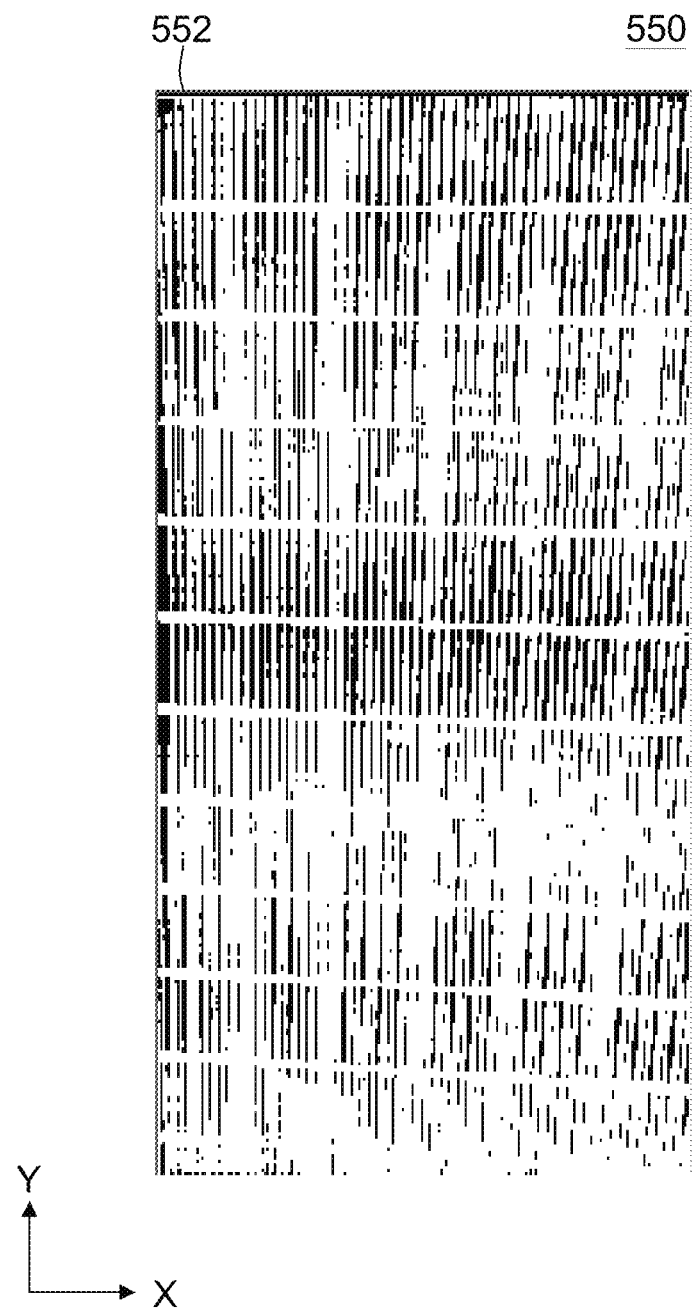
Figure 5F:
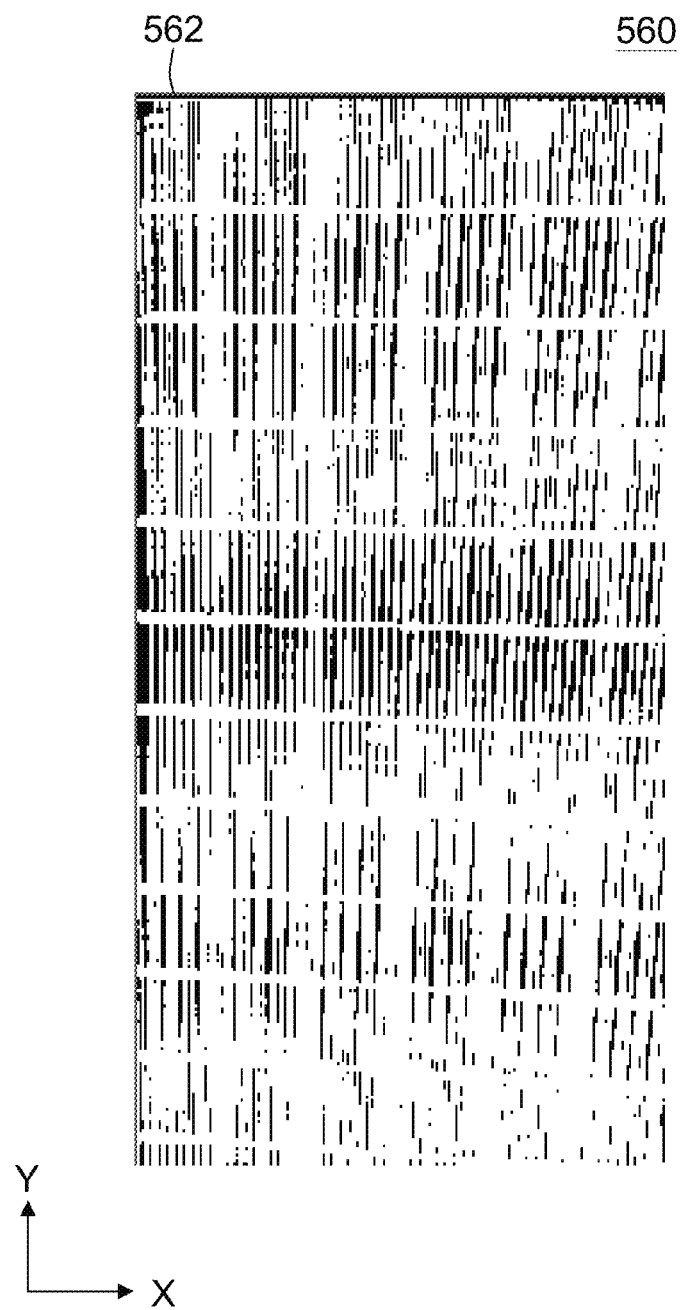
Figure 5G:
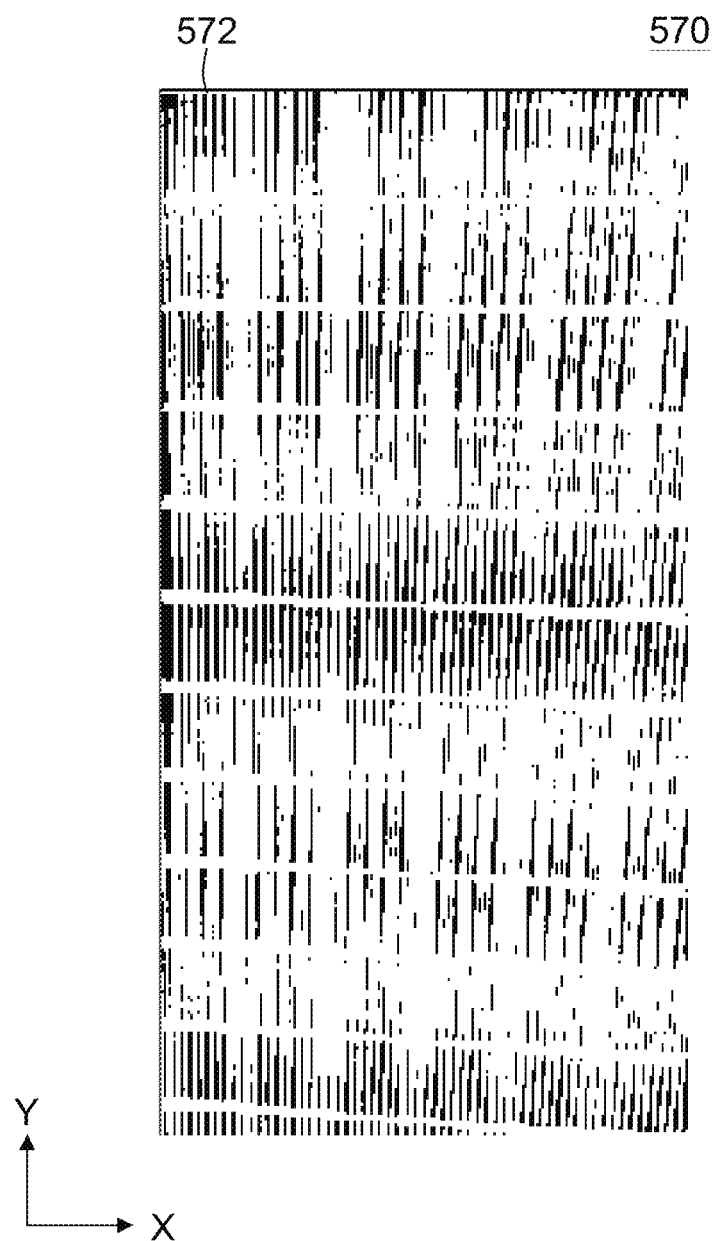

FIG. 5A to FIG. 5G illustrate forming a virtual moiré image with an overlapped image formed by the image to be tested and the reference image. An image 510 to be tested of FIG. 5A is a part of the solar panel. The white lines generated by the busbars of the solar panel are a characteristic pattern 512 of the image 510 to be tested. FIG. 5B is a to-be-tested overlapped image 520 generated by superimposing the image 510 to be tested of FIG. 5A. For the detailed description, the description of FIG. 2A and FIG. 2E may be referred to, and it is not repeated. FIG. 5C is a reference overlapped image 530 of the reference object of the object to be tested (the solar panel) of FIG. 5A. For the detailed description, the description of FIG. 3A and FIG. 3C may be referred to, and it is not repeated here.

FIG. 5D, FIG. 5E, FIG. 5F, and FIG. 5G are virtual moiré images according to some embodiments of the disclosure. According to some embodiments, FIG. 5D, FIG. 5E, FIG. 5F, and FIG. 5G are respectively a virtual moiré image 540, a virtual moiré image 550, a virtual moiré image 560, and a virtual moiré image 570 generated by superimposing the to-be-tested overlapped image 520 of FIG. 5B and the reference overlapped image 530 of FIG. 5C through image processing by the computer 30 and respectively moving the reference overlapped image 530 for a rotation angle 1.0°, 1.4°, 1.7°, 2.0° relative to the to-be-tested overlapped image. The virtual moiré image 540, the virtual moiré image 550, the virtual moiré image 560, and the virtual moiré image 570 respectively have a moiré pattern 542, a moiré pattern 552, a moiré pattern 562, and a moiré pattern 572. Through the virtual moiré image formed by the to-be-tested overlapped image 520 and the reference overlapped image 530, it may be determined whether deformation occurs in the to-be-tested overlapped image 520 to further obtain whether deformation occurs on the object to be tested.

Determining whether deformation occurs in an image through virtual moiré image is an application under research. When the virtual moiré image is generated, compared with the same image to be tested, a different virtual moiré image may be generated through a reference image with a different characteristic pattern, which may be applied to observing whether deformation occurs in the image to be tested.

Figure 6A:
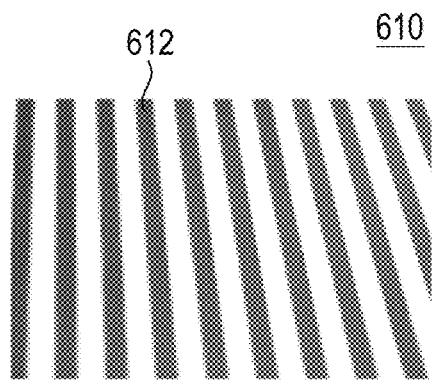
FIG. 6A is a reference overlapped image of a type of a reference image according to some embodiments of the disclosure.

FIG. 6A to FIG. 6E are virtual moiré images generated by the image to be tested by adopting one reference image in two different cases, in which deformation does not occur on the object to be tested and deformation occurs on object to be tested. FIG. 6A is a reference image 610 of a reference object according to some embodiments of the disclosure. The reference image 610 of the reference object of FIG. 6A has a characteristic pattern 612. As shown in FIG. 6A, the characteristic pattern 612 is in the shape of a stripe and extends along a vertical direction.

Figure 6B:
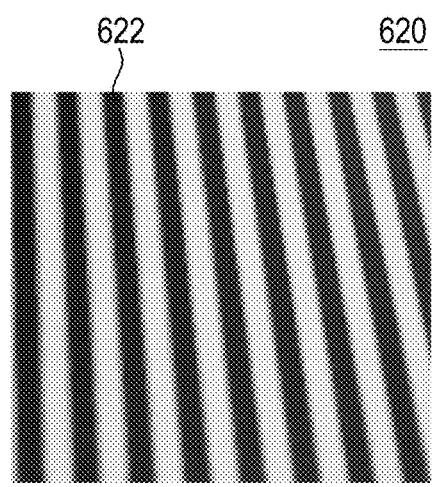
FIG. 6B is a to-be-tested overlapped image of a type of images to be tested according to embodiments of the disclosure.
Figure 6C:
FIG. 6C is a type of a virtual moiré image according to some embodiments of the disclosure.

FIG. 6B is an image 620 to be tested according to the embodiments of the disclosure. Deformation does not occur on the object to be tested of FIG. 6B. The image 620 to be tested of FIG. 6B has a characteristic pattern 622. As shown in FIG. 6B, the characteristic pattern 622 is in the shape of a stripe and roughly extends along a vertical direction. That is, the characteristic pattern 612 and the characteristic pattern 622 in FIG. 6A and FIG. 6B have extension directions that are substantially the same. The directions extend along the vertical direction. FIG. 6C is a virtual moiré image 630 generated by superimposing the reference image 610 of FIG. 6A and the image 620 to be tested of FIG. 6B. Since the extension directions of the characteristic pattern 612 and the characteristic pattern 622 in FIG. 6A and FIG. 6B are substantially the same and both of the directions extend along the vertical direction, a moiré pattern 632 of the virtual moiré image 630 of FIG. 6C is in the shape of a stripe and roughly extends along a vertical direction. In FIG. 6B, deformation does not occur on the object to be tested. Therefore, deformation does not occur on the moiré pattern 632 of the virtual moiré image 630 of FIG. 6C, and an arrangement of regular stripes that is similar to the characteristic pattern 612 of FIG. 6A is presented.

Figure 6D:
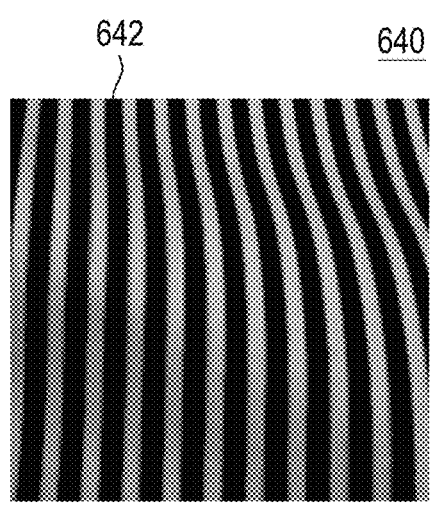
FIG. 6D is a to-be-tested overlapped image of another type of images to be tested according to embodiments of the disclosure.
Figure 6E:
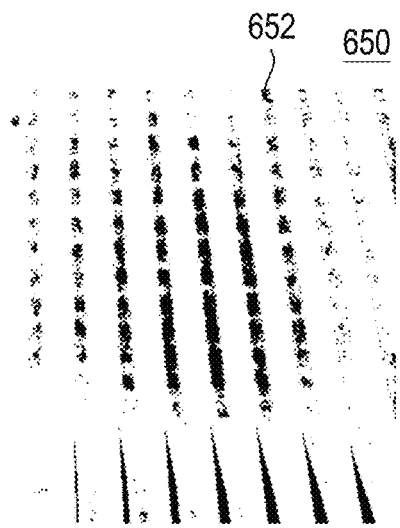
FIG. 6E is another type of a virtual moiré image according to some embodiments of the disclosure.

FIG. 6D is another image 640 to be tested according to the embodiments of the disclosure. Deformation occurs on the object to be tested of FIG. 6D. The image 640 to be tested of FIG. 6D has a characteristic pattern 642. As shown in FIG. 6D, the characteristic pattern 642 is in the shape of a stripe and roughly extends along a vertical direction. That is, the characteristic pattern 612 and the characteristic pattern 642 in FIG. 6A and FIG. 6D have extension directions that are substantially the same. The directions extend along the vertical direction. FIG. 6E is a virtual moiré image 650 generated by superimposing the reference image 610 of FIG. 6A and the image 640 to be tested of FIG. 6D. Since the extension directions of the characteristic pattern 612 and the characteristic pattern 642 in FIG. 6A and FIG. 6D are substantially the same and both of the directions extend along the vertical direction, the virtual moiré image of FIG. 6E is in the shape of a stripe and roughly extends along a vertical direction. In FIG. 6D, deformation occurs on the object to be tested. Therefore, a pattern with alternate bright part and dark part is generated in a moiré pattern 652 of the virtual moiré image 650 of FIG. 6E compared with the moiré pattern 632 of the virtual moiré image 630 of FIG. 6C, and the pattern is obviously different from the virtual moiré image 630 of FIG. 6C. Therefore, by comparing the virtual moiré image 630 of FIG. 6C generated in the case where deformation does not occur on the object to be tested and the virtual moiré image 650 of FIG. 6E generated in the case where deformation occurs on the object to be tested, it may be determined whether deformation occurs on the object to be tested.

Figure 7A:
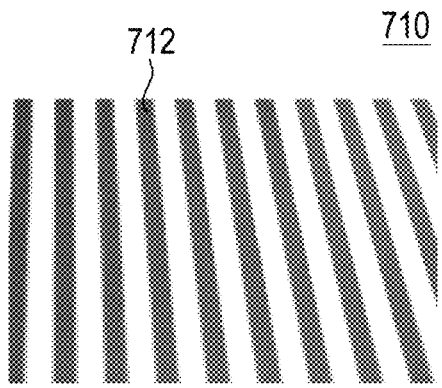
FIG. 7A is a reference overlapped image of a type of a reference image according to some embodiments of the disclosure.
Figure 7B:
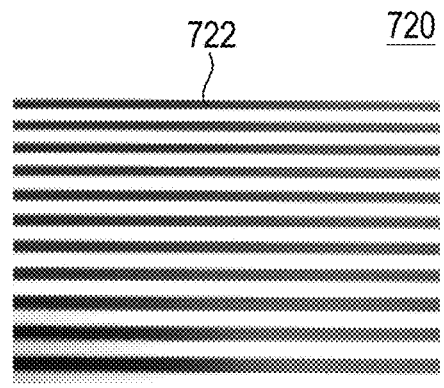
FIG. 7B is a reference overlapped image of another type of a reference image according to some embodiments of the disclosure.

FIG. 7A to FIG. 7F are virtual moiré images generated by adopting two characteristic patterns respectively in two different cases, in which deformation does not occur on the object to be tested and deformation occurs on object to be tested according to the embodiments of the disclosure. FIG. 7A is a reference image 710 of a reference object according to some embodiments of the disclosure. The reference image 710 of FIG. 7A has a characteristic pattern 712. As shown in FIG. 7A, the characteristic pattern 712 is in the shape of a stripe and roughly extends along a vertical direction. FIG. 7B is a reference image 720 of another reference object according to some embodiments of the disclosure. The reference image 720 of FIG. 7B has another characteristic pattern 722 different from the characteristic pattern 712 of the reference image 710 of FIG. 7A. According to some embodiments, as shown in FIG. 7B, the characteristic pattern 722 is in the shape of a stripe and roughly extends along a vertical direction. Therefore, when the characteristic patterns 712 and 722 of the reference images 710 and 720 in FIG. 7A and FIG. 7B, a reference image that is similar to a grid may be generated.

Figure 7C:
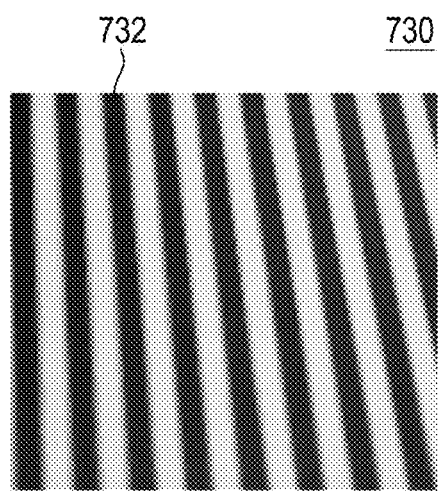
FIG. 7C is a to-be-tested overlapped image of a type of images to be tested according to embodiments of the disclosure.
Figure 7D:
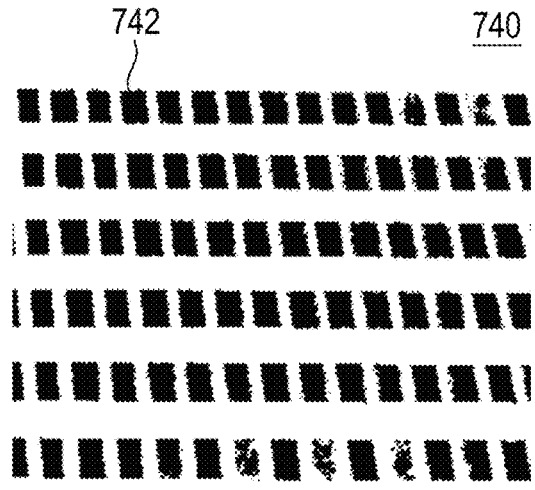
FIG. 7D is a type of a virtual moiré image according to some embodiments of the disclosure.

FIG. 7C is an image 730 to be tested according to the embodiments of the disclosure. Deformation does not occur on the object to be tested of FIG. 7C. The image 730 to be tested of FIG. 7C has a characteristic pattern 732. As shown in FIG. 7C, the characteristic pattern 732 is in the shape of a stripe and roughly extends along a vertical direction. That is, the characteristic pattern 712 of FIG. 7A and the characteristic pattern 732 of FIG. 7C have extension directions that are substantially the same. The directions extend along the vertical direction. In addition, the characteristic pattern 722 of FIG. 7B and the characteristic pattern 732 of FIG. 7C have different extension directions. The characteristic pattern 722 of FIG. 7B extends roughly along a horizontal direction that is different from the extension direction of the characteristic pattern 732 of FIG. 7C. FIG. 7D is a virtual moiré image 740 generated by superimposing the reference image 710 of FIG. 7A, the reference image 720 of FIG. 7B, and the image 730 to be tested of FIG. 7C. Since the characteristic pattern 712 of FIG. 7A and the characteristic patterns 722 of FIG. 7B are combined into a characteristic pattern with a grid pattern, a moiré pattern 742 of the virtual moiré image 740 of FIG. 7D is also with a grid pattern. In FIG. 7C, deformation does not occur on the object to be tested. Therefore, deformation does not occur on the moiré pattern 742 of the virtual moiré image 740 of FIG. 7D, and an arrangement of a regular grid pattern that is similar to the characteristic pattern of the combination of FIG. 7A and FIG. 7B is presented.

Figure 7E:
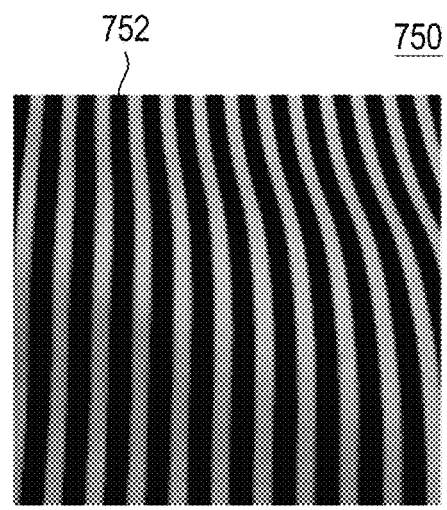
FIG. 7E is a to-be-tested overlapped image of another type of images to be tested according to embodiments of the disclosure.
Figure 7F:
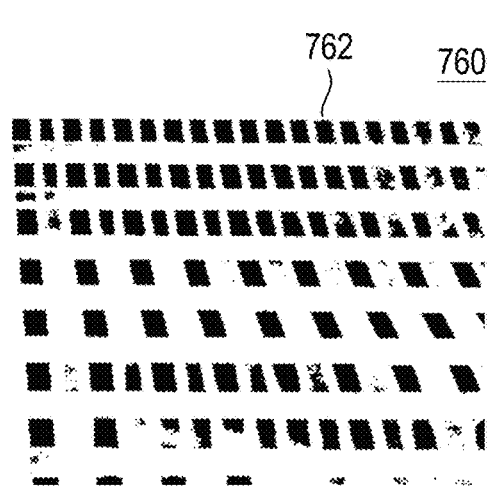
FIG. 7F is another type of a virtual moiré image according to some embodiments of the disclosure.

FIG. 7E is another image 750 to be tested according to the embodiments of the disclosure. Deformation occurs on the object to be tested of FIG. 7E. The image 750 to be tested of FIG. 7E has a characteristic pattern 752. As shown in FIG. 7E, the characteristic pattern 752 is in the shape of a stripe and roughly extends along a vertical direction. That is, the characteristic pattern 712 of FIG. 7A and the characteristic pattern 752 of FIG. 7E have extension directions that are substantially the same. The directions extend along the vertical direction. In addition, the characteristic pattern 722 of FIG. 7B and the characteristic pattern 752 of FIG. 7E have different extension directions. The characteristic pattern 712 of FIG. 7B extends roughly along a horizontal direction that is different from the extension direction of the characteristic pattern 752 of FIG. 7E. FIG. 7F is a virtual moiré image 760 generated by superimposing the reference image 710 of FIG. 7A, the reference image 720 of FIG. 7B, and the image 750 to be tested of FIG. 7E. Since the characteristic pattern 712 of FIG. 7A and the characteristic patterns 722 of FIG. 7B are combined into the characteristic pattern with the grid pattern, a moiré pattern 762 of the virtual moiré image 760 of FIG. 7F is also with a grid pattern. In FIG. 7E, deformation occurs on the object to be tested. Therefore, a pattern with alternate bright part and dark part is generated in a moiré pattern 762 of the virtual moiré image 760 of FIG. 7F compared with the moiré pattern 742 of the virtual moiré image 740 of FIG. 7D, and the pattern is obviously different from the moiré pattern 742 of the virtual moiré image 740 of FIG. 7D. Therefore, by comparing the virtual moiré image 740 of FIG. 7D generated in the case where deformation does not occur on the object to be tested and the virtual moiré image 760 of FIG. 7F generated in the case where deformation occurs on the object to be tested, it may be determined whether deformation occurs on the object to be tested.

In FIG. 6A to FIG. 6E and FIG. 7A to FIG. 7F, by superimposing the different reference images and the images to be tested of the object to be tested, the moiré images are generated. It is determined whether deformation occurs on the objected to be tested by determining whether deformation occurs in the moiré patterns of the virtual moiré images. In the embodiments, after the reference image and the image to be tested are superimposed, they remain relatively stationary with respect to each other. It is determined whether deformation occurs on the object to be tested through the virtual moiré image.

In addition, when the virtual moiré image is generated by superimposing the reference image of the reference object and the image to be tested of the object to be tested or when a relative movement is generated between the reference image and the image to be tested, such as the reference image is stationary while the image to be tested is moved or the image to be tested is stationary while the reference image is moved, the virtual moiré image changes accordingly. Through a change of the virtual moiré image, an extent of a change in the direction perpendicular to the surface to be tested may be obtained.

Figure 8A:
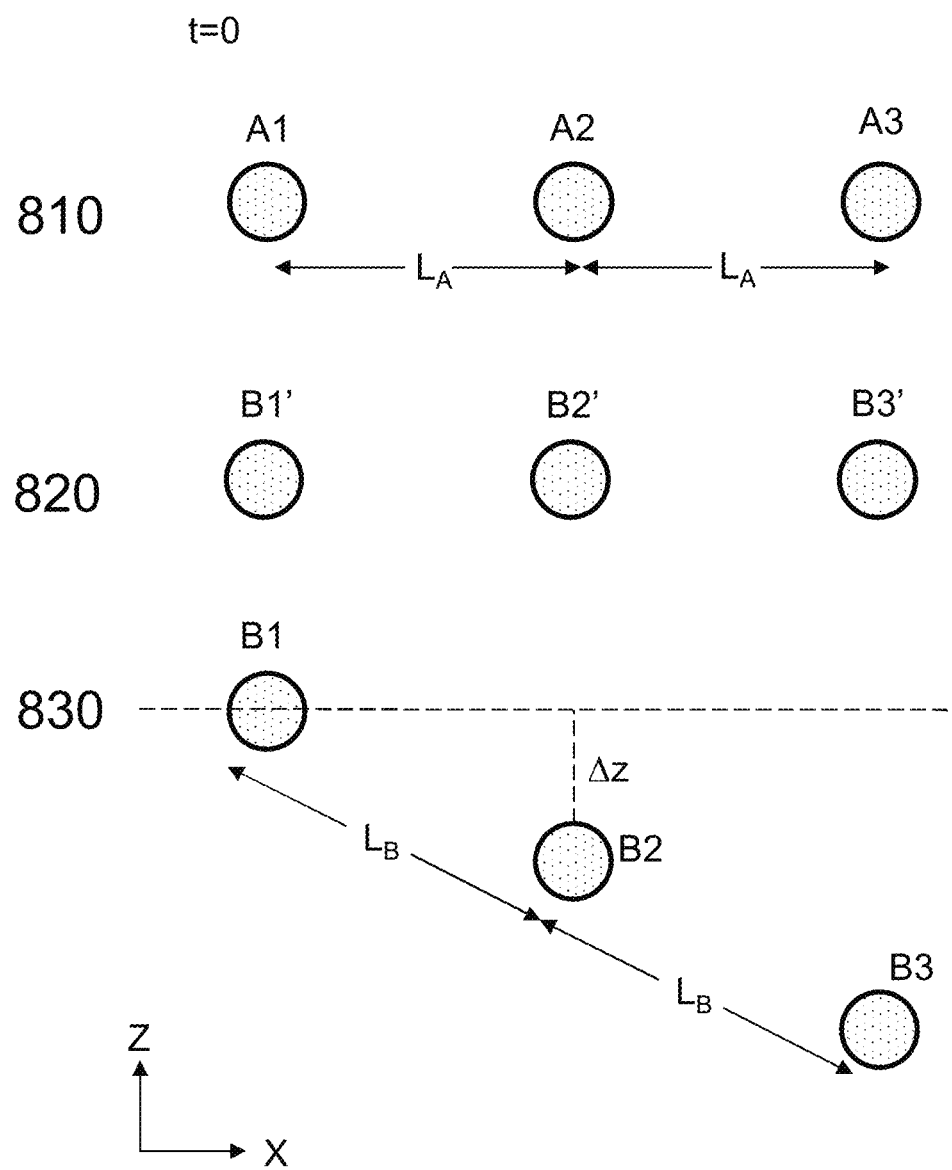
FIG. 8A and FIG. 8B are schematic diagrams illustrating relative positions of an image to be tested and a reference image according to some embodiments of the disclosure.

According to some embodiments, FIG. 8A is a schematic diagram illustrating superimposing the reference image and the image to be tested. An object 830 to be tested has points B1, B2, and B3. A distance between the points is $L_B$. According to some embodiments, the object to be tested may be the solar panel. The points B1, B2, and B3 may be the busbars of the solar panel. As shown in FIG. 8A, the object 830 to be tested has a displacement along the vertical direction (i.e. the Z-axis direction). A displacement of the point B2 with respect to the vertical direction is z. An image 820 to be tested is photographed from a direction perpendicular to the object 830 to be tested. The points B1, B2, and B3 of the object 830 to be tested respectively correspond to points B1', B2', and B3' in the image 820 to be tested. The points B1', B2', and B3' of the image 820 to be tested may be viewed as projections of the points B1, B2, and B3 of the object 830 to be tested in the horizontal direction (i.e. the X-axis direction).

A reference image 810 is disposed above the image 820 to be tested. The reference image 810 has points A1, A2, and A3. A distance between the points is $L_A$. According to some embodiments, the reference image may be an image of the standard solar panel. The points A1, A2, and A3 may be the busbars of the solar panel. According to some embodiments, the distance $L_A$ of the reference image 810 and the distance $L_B$ of the object 830 to be tested may the same or different.

When a starting time t=0, the point A1 of the reference image 810 and the point B' of the image to be tested are overlapped in the Z direction. Therefore, when the reference image 810 and the image 820 to be tested are observed in the Z direction, a virtual moiré image is generated at point A1.

Figure 8B:
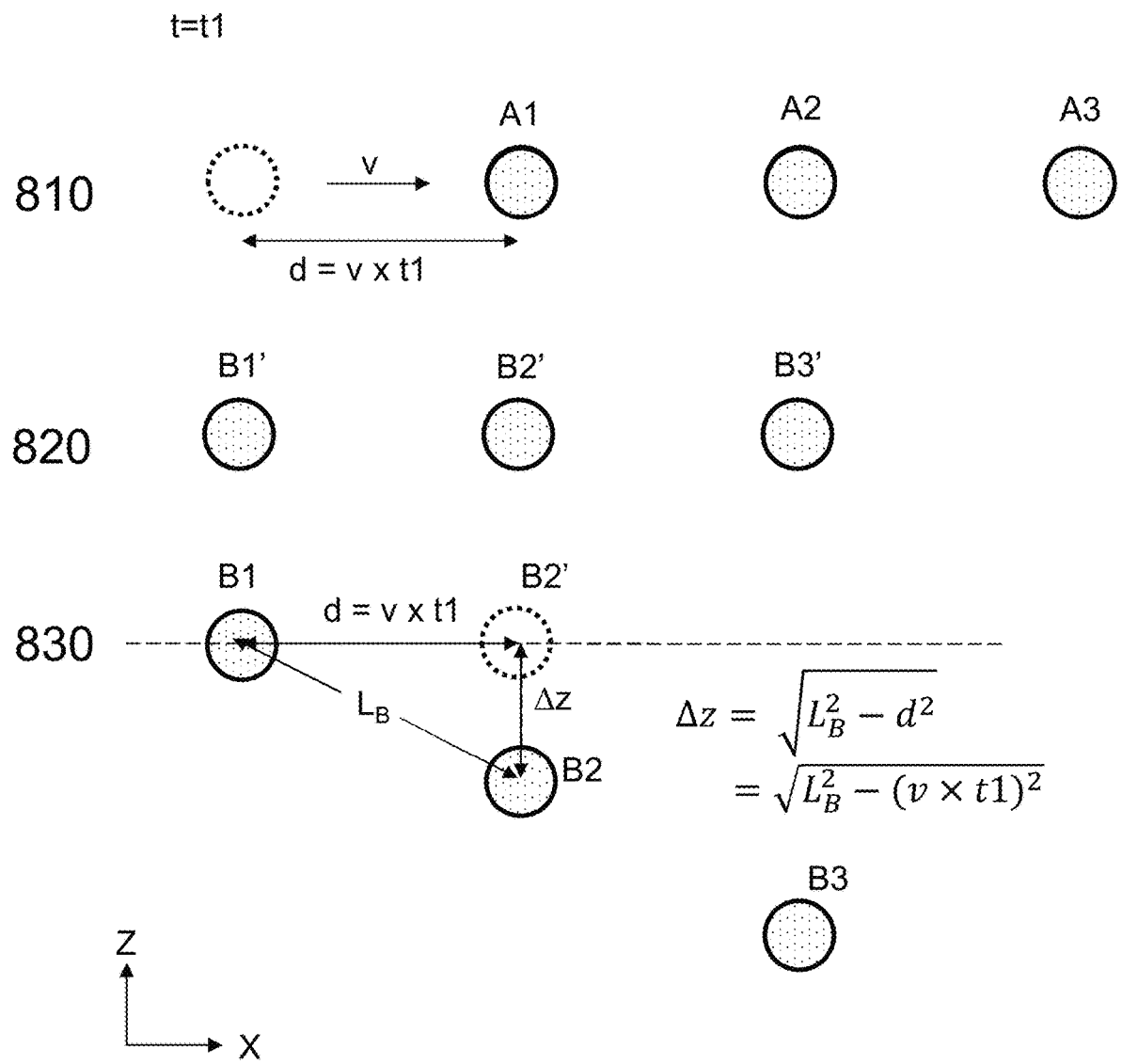

As shown in FIG. 8B, the reference image 810 and the image 820 to be tested move with respect to each other. According to some embodiments, the reference image 810 may be moved so that the image 820 to be tested stays stationary. The image 820 to be tested may also be moved so that the reference image 810 stays stationary. In FIG. 8B, the reference image 810 is moved to the right at a constant speed v. When t=t1, a point A1' is moved to the right a distance of d1=v×t1 and is located above the point B2' of the image 820 to be tested. The point A1' are overlapped with the point A1 of the reference image 810 and the projection of the point B2' of the image 820 to be tested in the direction of the Z direction. At a position of the point A1 of the reference image 810, the virtual moiré image is generated again since the position of the point A1 is overlapped with the point B2' of the image 820 to be tested in the direction of the Z direction. Therefore, when t=t1, the reference image 810 is moved a distance of d1=v×t1 and a moiré pattern is respectively generated at t=0 (FIG. 8A) and t=t1 (FIG. 8B). Therefore, it is obtained that in the image 820 to be tested, a distance between the point B1' and the point B2' is d1=v×t1.

Since the distance between the point B1 and the point B2 is $L_B$ and the point B1' and the point B2' are the projections of the point B1 and the point B2 in the X direction, through a geometric relationship of a right triangle, it may be obtained that a distance change Δz of the point B1 and the point B2 in the Z direction is $$\Delta = \sqrt{L_B^2 - d1^2} = \sqrt{L_B^2 - (v \times t1)^2} \quad (1)$$

As a result, according to equation (1), an extent of deformation of the object to be tested along the vertical direction may be obtained through a time when the moiré pattern is generated on the same point of the reference image.

When the object 830 to be tested nearly has no deformation in the Z-axis direction and Δz is substantially equal to 0, a moving distance d1 of the reference image 810 is equivalent to a projection of the distance $L_B$ of the object 830 to be tested in the X-axis direction, which is $L_B$. Therefore, when a length of d1 is $L_B$ (i.e. t1 is equivalent to $L_B/v$), a displacement of the object 830 to be tested in the Z-axis direction is relatively small.

When deformation occurs on the object 830 to be tested in the Z direction and Δz is substantially greater than 0, the moving distance d1 of the reference image 810 is equivalent to the projection of the distance $L_B$ of the object 830 to be tested in the X direction. If d1 is shorter (i.e. t1 is shorter), the projection of the distance $L_B$ of the object 830 to be tested in the X direction is smaller. That is, the object 830 to be tested has a greater displacement in the Z direction.

Therefore, a relative change of the image to be tested in the Z direction may be estimated through the change of the virtual moiré image generated by moving the reference image. In addition, since the measurement is conducted in the Z direction, a relative change of the object to be tested in the Z direction may be obtained. If it is required to obtain an absolute position of the object to be tested in the Z direction, other method is needed to assist positioning.

In summary of the above, in the disclosure, a single image capturing device is adopted to capture an image in the direction perpendicular to the object to be tested to test deformation of the object to be tested. In the method, image processing replaces a reference projection stripe required for conventional superimposing measurement. Simple information of deformation of the object to be tested may be rapidly provided for quick product quality analysis. The testing efficiency is effectively promoted and the testing cost is effectively reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A measuring method, comprising:
    forming an image to be tested of an object to be tested with a first characteristic pattern;
    copying the image to be tested to form a plurality of images to be tested, and superimposing the plurality of images to be tested to form a to-be-tested overlapped image, wherein the to-be-tested overlapped image has a plurality of the first characteristic patterns;
    forming a reference image of a reference object with a second characteristic pattern;
    copying the reference image to form a plurality of reference images, and superimposing the plurality of reference images to form a reference overlapped image, wherein the reference overlapped image has a plurality of the second characteristic patterns;
    superimposing the to-be-tested overlapped image and the reference overlapped image to generate a virtual moiré image, wherein the virtual moiré image has a moiré pattern, the moiré pattern is different from the plurality of the first characteristic patterns, and the moiré pattern is different from the plurality of the second characteristic patterns.

2. The measuring method according to claim 1, wherein the image to be tested is photographed along a direction perpendicular to a surface to be tested of the object to be tested.

3. The measuring method according to claim 1, wherein the reference image is photographed along a direction perpendicular to a reference surface of the reference object.

4. The measuring method according to claim 1, wherein the reference image is a computer aided design file of the reference object.

5. The measuring method according to claim 1, wherein the first characteristic pattern comprises a stripe, a circle, an ellipse, or an equivalent shape.

6. The measuring method according to claim 1, wherein the second characteristic pattern comprises a stripe, a circle, an ellipse, or an equivalent shape.

7. The measuring method according to claim 1, wherein the moiré pattern comprises a stripe, a circle, an ellipse, or an equivalent shape.

8. The measuring method according to claim 1, the method further comprising conducting a binarization process on the image to be tested.

9. The measuring method according to claim 1, the method further comprising conducting a binarization process on the reference image.

10. The measuring method according to claim 1, wherein superimposing the images is forming the to-be-tested overlapped image or forming the reference overlapped image through an image processing method.

11. The measuring method according to claim 1, wherein the to-be-tested overlapped image and the reference overlapped image are superimposed on each other through an image processing method to generate the virtual moiré image.

12. The measuring method according to claim 11, wherein the image processing method comprises causing the to-be-tested overlapped image and the reference overlapped image to be superimposed on each other after generating a relative displacement of the to-be-tested overlapped image and the reference overlapped image along a direction.

13. The measuring method according to claim 11, wherein the image processing method comprises causing the to-be-tested overlapped image and the reference overlapped image to be superimposed on each other after rotating clockwise or counterclockwise.

14. The measuring method according to claim 1, wherein a geometric size of the object to be tested is obtained from the moiré pattern through a mathematical method such as geometric projection and coordinate conversion.

15. A measuring method, comprising:
    forming an image to be tested of an object to be tested with a first characteristic pattern;
    copying the image to be tested to form a plurality of images to be tested, and superimposing the plurality of images to be tested to form a to-be-tested overlapped image, wherein the to-be-tested overlapped image has a plurality of the first characteristic patterns;
    forming a reference image of a reference object with a second characteristic pattern;
    copying the reference image to form a plurality of reference images, and superimposing the plurality of reference images to form a reference overlapped image, wherein the reference overlapped image has a plurality of the second characteristic patterns;
    superimposing the to-be-tested overlapped image and the reference overlapped image to generate a virtual moiré image, wherein the virtual moiré image has a moiré pattern, the moiré pattern is different from the plurality of the first characteristic patterns, and the moiré pattern is different from the plurality of the second characteristic patterns,
    generating a relative movement between the to-be-tested overlapped image and the reference overlapped image and causing the moiré pattern of the virtual moiré image to change,
    wherein a change of the moiré pattern corresponds to deformation of the object to be tested along a direction perpendicular to a surface of the object to be tested.

16. The measuring method according to claim 15, wherein the relative movement between the to-be-tested overlapped image and the reference overlapped image is a relative movement at a constant speed.

17. The measuring method according to claim 15, wherein the image to be tested is photographed along a direction perpendicular to a surface to be tested of the object to be tested.

18. The measuring method according to claim 15, wherein superimposing the images is forming the to-be-tested overlapped image or forming the reference overlapped image through an image processing method.

* * * * *